United States Patent
Wenger et al.

(10) Patent No.: US 10,920,748 B2
(45) Date of Patent: Feb. 16, 2021

(54) IMAGING ARRAY FOR BIRD OR BAT DETECTION AND IDENTIFICATION

(71) Applicant: IdentiFlight International, LLC, Louisville, CO (US)

(72) Inventors: Eric S. Wenger, Lakewood, CO (US); Andrew G. Oliver, Longmont, CO (US); Victor L. Babbitt, Superior, CO (US); Thomas R. Hiester, Broomfield, CO (US)

(73) Assignee: IDENTIFLIGHT INTERNATIONAL, LLC, Louisville, CO (US)

( * ) Notice: Subject to any disclaimer, the term of this patent is extended or adjusted under 35 U.S.C. 154(b) by 0 days.

(21) Appl. No.: 16/692,193

(22) Filed: Nov. 22, 2019

(65) Prior Publication Data
US 2020/0277933 A1    Sep. 3, 2020

Related U.S. Application Data

(63) Continuation of application No. 15/816,352, filed on Nov. 17, 2017, now Pat. No. 10,519,932, which is a
(Continued)

(51) Int. Cl.
*F03D 7/04* (2006.01)
*A01K 29/00* (2006.01)
(Continued)

(52) U.S. Cl.
CPC ............ *F03D 7/042* (2013.01); *A01K 29/005* (2013.01); *A01M 29/10* (2013.01); *A01M 29/16* (2013.01);
(Continued)

(58) Field of Classification Search
CPC . F03D 7/042; F03D 7/00; F03D 7/048; F03D 17/00; F03D 80/00; F03D 80/10;
(Continued)

(56) References Cited

U.S. PATENT DOCUMENTS 5,657,073 A * 8/1997 Henley ................. G03B 37/04
348/38
5,774,088 A    6/1998 Kreithen
(Continued)

FOREIGN PATENT DOCUMENTS

DE         94 13 712 U1    10/1994
DE    20 2010 010765 U1    11/2010
(Continued)

OTHER PUBLICATIONS

Arnett et al. (2007) "Impacts of Wind Energy Facilities on Wildlife and Wildlife Habitat," Technical Review 07-2. The Wildlife Society, 54 pp. Accessible on the Internet at URL: http://wildlife.org/wp-content/uploads/2014/05/Wind07-2.pdf. [Last Accessed Mar. 17, 2016].
(Continued)

*Primary Examiner* — Michael S Osinski
(74) *Attorney, Agent, or Firm* — Leydig, Voit & Mayer, Ltd.

(57) ABSTRACT

An automated system for mitigating risk from a wind farm. The automated system may include an array of a plurality of image capturing devices independently mounted in a wind farm. The array may include a plurality of low resolution cameras and at least one high resolution camera. The plurality of low resolution cameras may be interconnected and may detect a spherical field surrounding the wind farm. A server is in communication with the array of image capturing devices. The server may automatically analyze images to classify an airborne object captured by the array of image capturing devices in response to receiving the images.

19 Claims, 14 Drawing Sheets

Related U.S. Application Data continuation of application No. 14/829,439, filed on Aug. 18, 2015, now Pat. No. 9,856,856.

(60) Provisional application No. 62/040,081, filed on Aug. 21, 2014.

(51) Int. Cl.

| | | |
|---|---|---|
| *H04N 13/243* | (2018.01) | |
| *H04N 13/296* | (2018.01) | |
| *G06T 7/20* | (2017.01) | |
| *A01M 29/10* | (2011.01) | |
| *A01M 29/16* | (2011.01) | |
| *A01M 31/00* | (2006.01) | |
| *G06K 9/00* | (2006.01) | |
| *F03D 80/00* | (2016.01) | |
| *F03D 80/10* | (2016.01) | |
| *G06K 9/62* | (2006.01) | |
| *H04N 5/247* | (2006.01) | |
| *F03D 17/00* | (2016.01) | |
| *E04B 1/72* | (2006.01) | |
| *H04N 5/232* | (2006.01) | |
| *H02S 10/12* | (2014.01) | |
| *F03D 9/00* | (2016.01) | |
| *F03D 9/25* | (2016.01) | |

(52) U.S. Cl.
CPC ............. *A01M 31/002* (2013.01); *E04B 1/72* (2013.01); *F03D 7/048* (2013.01); *F03D 17/00* (2016.05); *F03D 80/00* (2016.05); *F03D 80/10* (2016.05); *G06K 9/0063* (2013.01); *G06K 9/00369* (2013.01); *G06K 9/6267* (2013.01); *G06T 7/20* (2013.01); *H04N 5/23238* (2013.01); *H04N 5/247* (2013.01); *H04N 13/243* (2018.05); *H04N 13/296* (2018.05); *F03D 9/007* (2013.01); *F03D 9/257* (2017.02); *F05B 2270/804* (2013.01); *H02S 10/12* (2014.12); *Y02E 10/72* (2013.01)

(58) Field of Classification Search
CPC ..... A01K 29/005; A01M 29/00; A01M 29/10; A01M 29/16; A01M 31/002; E04B 1/72; G06F 3/005; G06K 9/00369; G06K 9/0063; G06K 9/6267; H04N 5/23238; H04N 5/247; H04N 5/2252; H04N 7/181; H04N 13/0242; H04N 13/0296
See application file for complete search history.

(56) References Cited

U.S. PATENT DOCUMENTS

| | | | |
|---|---|---|---|
| 6,250,255 B1 | 6/2001 | Lenhardt et al. | |
| 6,323,858 B1* | 11/2001 | Gilbert | H04N 5/232 345/419 |
| 6,411,327 B1 | 6/2002 | Kweon et al. | |
| 6,623,243 B1 | 9/2003 | Hodos | |
| 6,809,887 B1* | 10/2004 | Gao | H04N 5/23238 359/725 |
| 6,947,059 B2* | 9/2005 | Pierce | H04N 5/23238 345/629 |
| 7,429,997 B2* | 9/2008 | Givon | G03B 35/00 348/46 |
| 7,463,280 B2* | 12/2008 | Steuart, III | G03B 35/08 348/36 |
| 7,506,815 B2 | 3/2009 | Spiegel | |
| 7,643,055 B2* | 1/2010 | Uebbing | H04N 7/181 348/155 |
| 7,684,591 B2* | 3/2010 | Tamura | H04N 5/247 382/103 |
| 7,701,362 B2 | 4/2010 | Philiben | |
| 7,773,121 B1 | 8/2010 | Huntsberger et al. | |
| 7,806,604 B2* | 10/2010 | Bazakos | G06K 9/00255 396/427 |
| 7,952,608 B2* | 5/2011 | Thompson | G08B 13/19656 348/143 |
| 7,971,827 B2 | 7/2011 | Barrientos et al. | |
| 8,106,936 B2* | 1/2012 | Strzempko | H04N 5/2624 348/36 |
| 8,123,476 B2 | 2/2012 | Stommel | |
| 8,253,777 B2* | 8/2012 | Lin | H04N 5/23238 348/36 |
| 8,284,258 B1 | 10/2012 | Cetin et al. | |
| 8,379,486 B2 | 2/2013 | Adler et al. | |
| 8,401,225 B2 | 3/2013 | Newcombe et al. | |
| 8,446,457 B2* | 5/2013 | Theobald | H04N 5/23238 348/36 |
| 8,446,509 B2* | 5/2013 | Jones | H04N 5/247 348/333.03 |
| 8,553,113 B2* | 10/2013 | Ansari | H04N 5/3415 348/264 |
| 8,598,998 B2 | 12/2013 | Vassilev et al. | |
| 8,742,977 B1 | 6/2014 | Piesinger | |
| 8,780,198 B2 | 7/2014 | McClure et al. | |
| 8,810,411 B2 | 8/2014 | Marka et al. | |
| 8,988,230 B2* | 3/2015 | Nohara | A01M 31/002 340/573.2 |
| 9,001,211 B1* | 4/2015 | Spivey | G08B 13/196 348/159 |
| 9,046,080 B2 | 6/2015 | Sliwa | |
| 9,124,812 B2* | 9/2015 | Yoo | H04N 5/23299 |
| 9,125,394 B2 | 9/2015 | Kinzie et al. | |
| 9,152,019 B2* | 10/2015 | Kintner | H04N 5/23238 |
| 9,402,026 B2* | 7/2016 | St. Clair | H04N 5/23238 |
| 9,413,930 B2* | 8/2016 | Geerds | H04N 5/23238 |
| 9,413,954 B1* | 8/2016 | Theobald | H04N 5/2251 |
| 9,521,830 B2* | 12/2016 | Wenger | A01M 29/16 |
| 9,583,133 B2* | 2/2017 | Hirata | H04N 5/23241 |
| 9,609,234 B1* | 3/2017 | Checka | H04N 5/2258 |
| 9,775,337 B2* | 10/2017 | Duncan | A01M 31/002 |
| 9,816,486 B2* | 11/2017 | Wenger | E04B 1/72 |
| 9,856,856 B2 | 1/2018 | Wenger et al. | |
| 9,891,049 B2* | 2/2018 | Brown | G01C 11/02 |
| 10,026,284 B2* | 7/2018 | Takiguchi | G06T 7/20 |
| 10,275,679 B2 | 4/2019 | Jorquera et al. | |
| 10,519,932 B2 | 12/2019 | Wenger et al. | |
| 2001/0019357 A1* | 9/2001 | Ito | G08B 13/19608 348/152 |
| 2001/0030280 A1 | 10/2001 | Rockinger et al. | |
| 2002/0180759 A1* | 12/2002 | Park | G06T 5/50 345/629 |
| 2004/0100443 A1 | 5/2004 | Mandelbaum et al. | |
| 2004/0212677 A1* | 10/2004 | Uebbing | H04N 7/181 348/155 |
| 2004/0247173 A1* | 12/2004 | Nielsen | H04N 5/2628 382/154 |
| 2005/0162978 A1* | 7/2005 | Lima | F03D 80/00 367/139 |
| 2005/0207487 A1* | 9/2005 | Monroe | G08B 13/19693 375/240.01 |
| 2005/0275721 A1* | 12/2005 | Ishii | H04N 7/188 348/159 |
| 2006/0012681 A1* | 1/2006 | Fujii | H04N 7/181 348/169 |
| 2006/0077262 A1* | 4/2006 | Miyamaki | H04N 5/23299 348/211.99 |
| 2006/0125921 A1* | 6/2006 | Foote | G06T 3/4038 348/159 |
| 2006/0192856 A1* | 8/2006 | Tamura | H04N 5/247 348/169 |
| 2006/0204035 A1 | 9/2006 | Guo et al. | |
| 2007/0092245 A1* | 4/2007 | Bazakos | G06K 9/00255 396/427 |
| 2007/0109407 A1* | 5/2007 | Thompson | G08B 13/19632 348/143 |
| 2007/0206945 A1* | 9/2007 | DeLorme | G03B 41/00 396/332 |

(56) References Cited

U.S. PATENT DOCUMENTS

| | | | |
|---|---|---|---|
| 2008/0084787 A1 | 4/2008 | Graber | |
| 2008/0260531 A1 | 10/2008 | Stommel | |
| 2008/0298674 A1 | 12/2008 | Baker et al. | |
| 2008/0298692 A1 | 12/2008 | Guo et al. | |
| 2008/0298962 A1* | 12/2008 | Sliwa | F03D 80/00 416/31 |
| 2009/0185900 A1 | 7/2009 | Hirakata et al. | |
| 2010/0141767 A1* | 6/2010 | Mohanty | G08B 13/19643 348/159 |
| 2010/0201525 A1* | 8/2010 | Bahat | A01M 29/10 340/573.2 |
| 2010/0231687 A1* | 9/2010 | Amory | H04N 5/23238 348/36 |
| 2010/0245539 A1* | 9/2010 | Lin | H04N 5/23238 348/36 |
| 2010/0265331 A1* | 10/2010 | Tanaka | H04N 5/23299 348/159 |
| 2011/0043630 A1 | 2/2011 | McClure et al. | |
| 2011/0069148 A1* | 3/2011 | Jones | H04N 5/232 348/36 |
| 2011/0109491 A1 | 5/2011 | Laufer | |
| 2011/0115969 A1* | 5/2011 | Whillock | H04N 5/2256 348/370 |
| 2011/0144829 A1 | 6/2011 | Kim et al. | |
| 2011/0164108 A1 | 7/2011 | Bates et al. | |
| 2011/0192212 A1* | 8/2011 | Delprat | F03D 17/00 73/12.01 |
| 2011/0260907 A1* | 10/2011 | Roche | F03D 7/02 342/27 |
| 2012/0003089 A1 | 1/2012 | Byreddy et al. | |
| 2012/0147133 A1* | 6/2012 | Hadwiger | G06T 3/0012 348/36 |
| 2012/0154521 A1* | 6/2012 | Townsend | H04N 5/247 348/36 |
| 2012/0154522 A1* | 6/2012 | Yoo | H04N 5/247 348/36 |
| 2012/0242788 A1* | 9/2012 | Chuang | G08B 13/19602 348/36 |
| 2012/0242837 A1* | 9/2012 | Sasagawa | G03B 17/00 348/159 |
| 2012/0257064 A1* | 10/2012 | Kim | G08B 13/19626 348/159 |
| 2012/0328152 A1* | 12/2012 | Bamba | G06T 3/0062 382/103 |
| 2013/0050400 A1* | 2/2013 | Stiesdal | F03D 80/00 348/36 |
| 2013/0052010 A1* | 2/2013 | Nielsen | F03D 7/042 416/1 |
| 2013/0098309 A1* | 4/2013 | Nohara | A01M 29/16 119/713 |
| 2013/0100255 A1 | 4/2013 | Ohba et al. | |
| 2013/0155235 A1 | 6/2013 | Clough et al. | |
| 2013/0188070 A1* | 7/2013 | Lee | G06T 7/246 348/222.1 |
| 2013/0201296 A1* | 8/2013 | Weiss | H04N 13/243 348/48 |
| 2013/0224018 A1 | 8/2013 | Kinzie et al. | |
| 2013/0249218 A1* | 9/2013 | Vassilev | A01M 29/16 290/55 |
| 2013/0257641 A1 | 10/2013 | Ronning | |
| 2013/0280033 A1* | 10/2013 | Babbitt | F03D 80/00 415/1 |
| 2013/0298845 A1 | 11/2013 | Blanchard | |
| 2014/0029855 A1 | 1/2014 | Manako et al. | |
| 2014/0144390 A1* | 5/2014 | Duncan | A01M 29/18 119/713 |
| 2014/0148978 A1* | 5/2014 | Duncan | A01M 29/12 701/3 |
| 2014/0153916 A1* | 6/2014 | Kintner | G03B 37/04 396/419 |
| 2014/0160274 A1* | 6/2014 | Ishida | G01S 19/14 348/113 |
| 2014/0201126 A1 | 7/2014 | Zadeh et al. | |
| 2014/0241878 A1* | 8/2014 | Herrig | F03D 7/00 416/1 |
| 2014/0261151 A1* | 9/2014 | Ronning | A01M 29/10 116/22 A |
| 2014/0267596 A1* | 9/2014 | Geerds | H04N 5/2252 348/38 |
| 2014/0313345 A1* | 10/2014 | Conard | G06K 9/00664 348/169 |
| 2014/0341427 A1* | 11/2014 | Kawano | G06K 9/00255 382/103 |
| 2014/0362176 A1* | 12/2014 | St. Clair | H04N 5/2251 348/36 |
| 2015/0010399 A1* | 1/2015 | Bahat | A01M 29/10 416/1 |
| 2015/0230450 A1 | 8/2015 | Norris | |
| 2015/0341557 A1* | 11/2015 | Chapdelaine-Couture | G06T 3/0006 348/38 |
| 2015/0373279 A1* | 12/2015 | Osborne | H04N 5/232 348/36 |
| 2016/0014335 A1 | 1/2016 | Chuang et al. | |
| 2016/0042622 A1* | 2/2016 | Takiguchi | G01S 3/7864 348/143 |
| 2016/0053744 A1* | 2/2016 | Wenger | A01K 29/005 119/713 |
| 2016/0055399 A1* | 2/2016 | Hiester | A01M 29/16 382/110 |
| 2016/0055400 A1* | 2/2016 | Jorquera | F03D 17/00 416/1 |
| 2016/0063310 A1 | 3/2016 | Okamoto et al. | |
| 2016/0078298 A1* | 3/2016 | Wu | G08B 13/19643 348/143 |
| 2016/0198130 A1* | 7/2016 | Chen | G06K 9/00771 348/143 |
| 2016/0323504 A1* | 11/2016 | Ono | H04N 5/2251 |
| 2017/0026573 A1* | 1/2017 | Lee | H04N 5/23238 |
| 2017/0101980 A1* | 4/2017 | Wenger | H04N 13/296 |
| 2017/0161563 A1* | 6/2017 | Cetin | G06K 9/52 |
| 2017/0163888 A1* | 6/2017 | Norland | H04N 7/181 |
| 2017/0234966 A1 | 8/2017 | Naguib et al. | |
| 2017/0323539 A1* | 11/2017 | Takiguchi | G01S 3/7864 |
| 2017/0353658 A1* | 12/2017 | Colin | H04N 5/247 |
| 2018/0005045 A1* | 1/2018 | Kawano | G06K 9/00255 |
| 2018/0163699 A1 | 6/2018 | Wenger et al. | |
| 2019/0325254 A1 | 10/2019 | Jorquera et al. | |

FOREIGN PATENT DOCUMENTS

| | | |
|---|---|---|
| DE | 10 2008 018880 A1 | 12/2010 |
| DE | 10 2012 215451 A1 | 2/2013 |
| EP | 2 017 470 A1 | 1/2009 |
| EP | 2 190 092 A2 | 5/2010 |
| EP | 1 937 966 B1 | 11/2011 |
| JP | 2003-021046 A1 | 1/2003 |
| WO | WO 01/08478 A1 | 2/2001 |
| WO | WO 2009/102001 A1 | 8/2009 |
| WO | WO 2010/067057 A2 | 6/2010 |
| WO | WO 2012/054313 A1 | 4/2012 |
| WO | WO 2013/114368 A2 | 8/2013 |
| WO | WO 2015/187172 A1 | 12/2015 |
| WO | WO 2016/028922 A1 | 2/2016 |
| WO | WO 2016/028924 A1 | 2/2016 |

OTHER PUBLICATIONS

DTBird Product Brochure (2013) "A Self-Working System to Reduce Bird and Bat Mortality at Wind Farms," DTBird.

DeTect (2014) "Bird & Bat Radar Systems," DeTect, Inc. Accessible on the Internet at URL: http://www.detect-inc.com/avian.html. [Last Accessed Mar. 17, 2016].

DTBird (Jan. 2013) "DTBird versus Radar Technology in operating Wind Farms," DTBird.

Extended European Search Report corresponding to EP Patent Application No. 15834027.3, dated Mar. 27, 2018, 10 pp.

(56) References Cited

OTHER PUBLICATIONS

Extended European Search Report corresponding to EP Patent Application 15833849.1, dated May 18, 2018, 10 pp.
International Search Report with Written Opinion corresponding to International Patent Application No. PCT/US2015/046327, dated Nov. 9, 2015, 18 pp.
Li et al. (Apr. 2014) "Automatic Bird Species Detection From Crowd Sourced Videos," IEEE Transactions on Automation Science and Engineering, IEEE Service Center, New York, NY 11(2): 348-358.
Mahammed et al. (Mar. 2013) "Object Distance Measurement by Stereo Vision," International Journal of Science and Applied Information Technology. 2(2):5-8.
May et al. (Dec. 2012) "Evaluation of the DTBird video-system at the Smola wind-power plant. Detection Capabilities for Capturing Near-Turbine Avian Behavior," Report No. 910. Norwegian Institute for Nature Research, 32 pp.
Official Communication from the European Patent Office (EPO) Examining Division corresponding to EP Patent Application No. 15834027.3, dated Jan. 17, 2019, 7 pages.
PCT International Search Report for corresponding PCT International Patent Application No. PCT/US2015/045949, dated Oct. 29, 2015.
PCT International Search Report for corresponding PCT International Patent Application No. PCT/US2015/045945, dated Oct. 29, 2015.
Supplementary European Search Report, Application No. EP 15834027, dated Apr. 13, 2018, 11 pages.
U.S. Appl. No. 14/829,403, filed Aug. 18, 2015.
U.S. Appl. No. 14/829,439, filed Aug. 18, 2015.
U.S. Appl. No. 14/832,370, filed Aug. 21, 2015.
U.S. Appl. No. 15/384,550, filed Dec. 20, 2016.
U.S. Appl. No. 15/787,087, filed Oct. 18, 2017.
U.S. Appl. No. 15/816,352, filed Nov. 17, 2017.
U.S. Appl. No. 16/283,526, filed Feb. 22, 2019.

\* cited by examiner

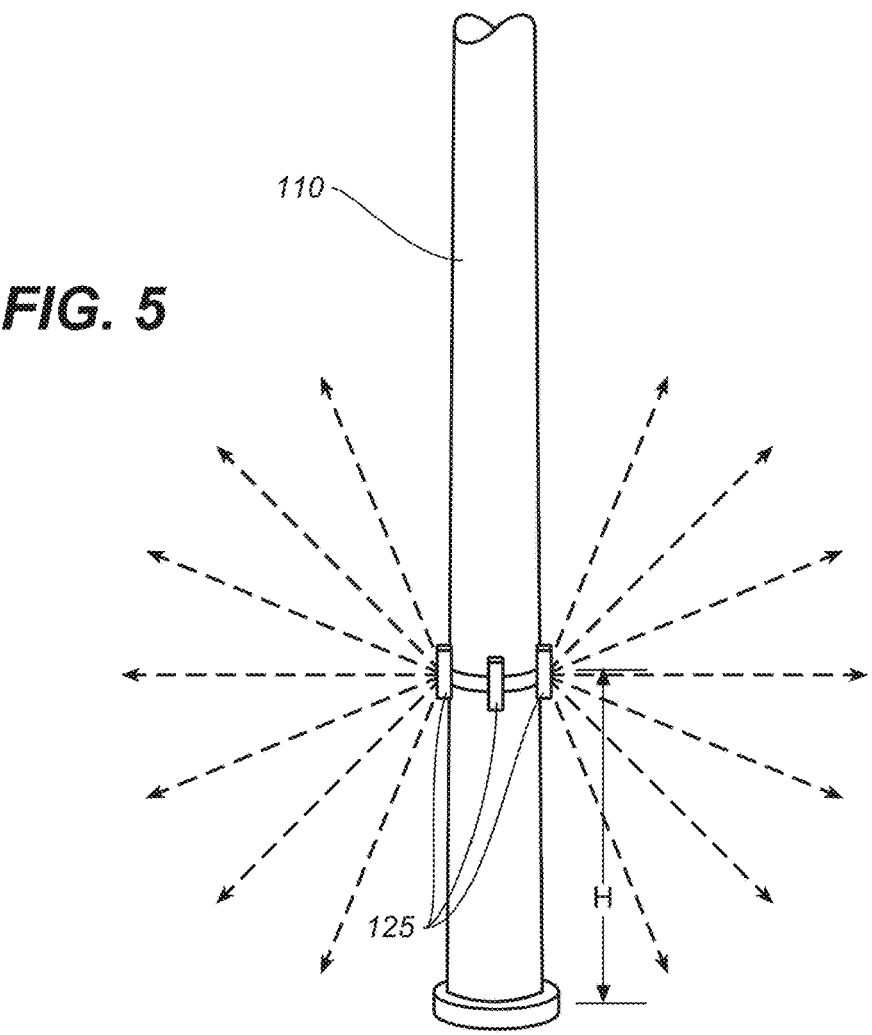
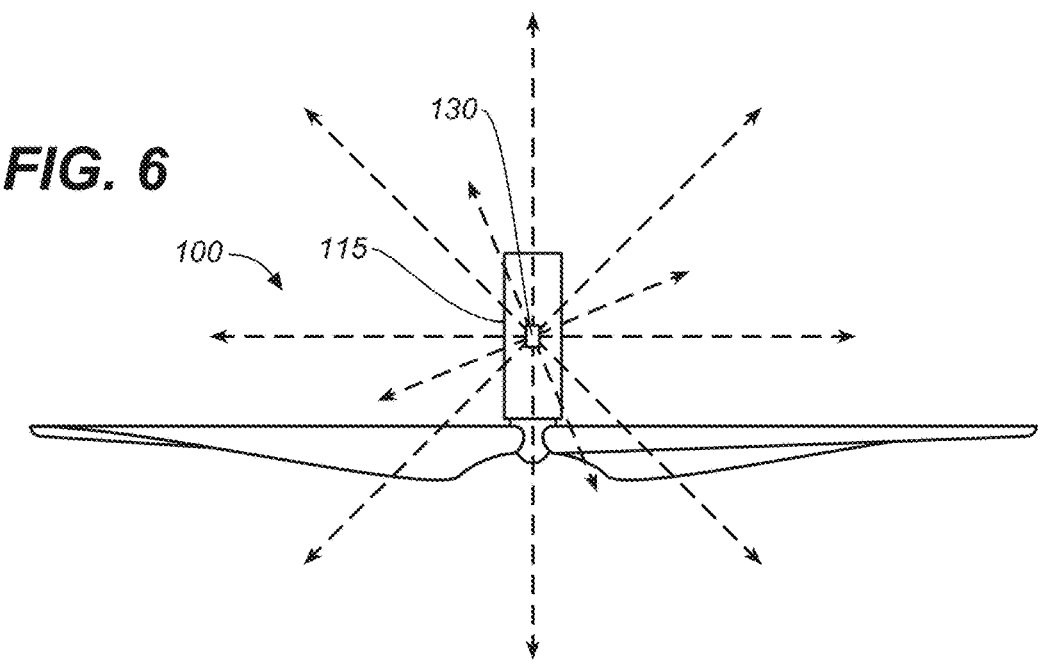

IMAGING ARRAY FOR BIRD OR BAT DETECTION AND IDENTIFICATION

CROSS REFERENCE TO RELATED APPLICATIONS

This application is a continuation of U.S. patent application Ser. No. 15/816,352 filed Nov. 17, 2017, which is a continuation of U.S. patent application Ser. No. 14/829,439 filed Aug. 18, 2015, now U.S. Pat. No. 9,856,856 issued Jan. 2, 2018, which claims the benefit of, and priority to, U.S. Provisional Patent Application No. 62/040,081 filed on Aug. 21, 2014, each of which is herein incorporated by reference.

FIELD OF THE INVENTION

This disclosure relates generally to systems and methods for assessing and/or reducing risks to birds and/or bats.

BACKGROUND

It is often desirable to evaluate or survey the patterns, frequencies, and behaviors of flying species, such as birds or bats. For example, the spinning turbine blades of wind farms pose a risk to birds or bats that fly through the volume swept by the turbine blades. Some government entities may require wind farms to mitigate that risk, particularly for certain bird or bat species protected by law or government regulations. For example, these government entities may require that mitigation of the risk to Golden Eagles or Bald Eagles from a proposed wind farm be demonstrated before installation of the wind farm is permitted. Other governments may not require a permit, but may still issue penalties or fines for those wind farms that harm government identified birds or other animals.

Attempts to mitigate the risk posed by wind farms to protected bird or bat species typically involve curtailing (e.g., slowing or shutting down) operation of wind turbines when it is determined that protected birds or bats may be present. Existing mitigation methods typically cannot specifically identify birds or bats that they detect, and may therefore curtail operation of wind turbines more often than is necessary to mitigate risk to protected bird and bat species. This results in loss of energy and revenue. Further, existing mitigation methods typically have a high capital cost.

SUMMARY

This specification discloses systems and methods that employ automated optical imaging technology to mitigate the risk posed by wind turbines to protected bird and/or bat species, other types of objects, or combinations thereof and related systems and methods that employ automated optical imaging to assess such risk prior to or after construction of a wind farm by surveying bird and/or bat populations, surveying other types of risks, or combinations thereof in the vicinity of the wind farm site.

In one aspect of the invention, an automated system for mitigating risk from a wind turbine includes a plurality of optical imaging sensors and a controller. The controller is configured to automatically receive and analyze images from the optical imaging sensors, to automatically send a signal to curtail operation of the wind turbine to a predetermined risk mitigating level when the controller determines from images from the optical imaging sensors that an is at risk from the wind turbine, and to subsequently automatically send a signal to resume normal operation of the wind turbine when the controller determines from additional images from the optical imaging sensors that there is no longer risk from the wind turbine to an airborne object of the one or more predetermined species.

The controller may be configured to determine whether each bird or bat it detects in images from the optical imaging sensors is a member of a particular predetermined species before the detected bird or bat is closer to the wind turbine than the distance the particular predetermined species can fly at a characteristic speed of the particular predetermined species in the time required to curtail operation of the wind turbine to the predetermined risk mitigating level. The characteristic speed of the particular predetermined species may be, for example, the average horizontal flight speed of the predetermined species or the maximum horizontal flight speed of the predetermined species.

In some variations the predetermined species include Golden Eagles. In some of these variations the controller determines whether each bird or bat it detects in images from the optical imaging sensors is a Golden Eagle before the detected bird or bat is closer than about 600 meters to the wind turbine. The controller may detect at a distance greater than about 800 meters each bird or bat that it subsequently determines is a Golden Eagle.

In some variations the predetermined species include Bald Eagles. In some of these variations the controller determines whether each bird or bat it detects in images from the optical imaging sensors is a Bald Eagle before the detected bird or bat is closer than about 600 meters to the wind turbine. The controller may detect at a distance greater than about 800 meters each bird or bat that it subsequently determines is a Bald Eagle.

The plurality of optical imaging sensors may be arranged with a combined field of view of about 360 degrees or more around the wind turbine. The optical imaging sensors may be arranged with overlapping fields of view. In some variations, at least some of the optical imaging sensors are attached to a tower supporting the wind turbine. In some variations one or more of the optical imaging sensors is arranged with a field of view directly above the wind turbine.

The system may comprise a deterrent system configured to deploy bird and/or bat deterrents, such as flashing lights or sounds for example, to deter birds and/or bats from approaching the wind turbine. In such variations the controller may be configured to automatically send a signal to the deterrent system to deploy a bird or bat deterrent if the controller determines from images from the optical imaging sensors that a bird or bat of the one or more predetermined species is approaching the wind turbine.

In another aspect, an automated system for mitigating risk from a wind turbine to birds or bats of one or more predetermined species comprises a plurality of optical imaging sensors and a controller. The controller is configured to automatically receive and analyze images from the optical imaging sensors and to automatically send a signal to the deterrent system to deploy a bird or bat deterrent if the controller determines from images from the optical imaging sensors that a bird or bat of the one or more predetermined species is approaching the wind turbine.

The controller may be configured to determine whether each bird or bat it detects in images from the optical imaging sensors is a member of a particular predetermined species before the detected bird or bat is closer to the wind turbine than the distance the particular predetermined species can fly at a characteristic speed of the particular predetermined species in the time required to curtail operation of the wind turbine to a predetermined risk mitigating level. The characteristic speed of the particular predetermined species may be, for example, the average horizontal flight speed of the predetermined species or the maximum horizontal flight speed of the predetermined species.

In some variations the predetermined species include Golden Eagles. In some of these variations the controller determines whether each bird or bat it detects in images from the optical imaging sensors is a Golden Eagle before the detected bird or bat is closer than about 600 meters to the wind turbine. The controller may detect at a distance greater than about 800 meters each bird or bat that it subsequently determines is a Golden Eagle.

In some variations the predetermined species include Bald Eagles. In some of these variations the controller determines whether each bird or bat it detects in images from the optical imaging sensors is a Bald Eagle before the detected bird or bat is closer than about 600 meters to the wind turbine. The controller may detect at a distance greater than about 800 meters each bird or bat that it subsequently determines is a Bald Eagle.

The plurality of optical imaging sensors may be arranged with a combined field of view of about 360 degrees or more around the wind turbine. The optical imaging sensors may be arranged with overlapping fields of view. In some variations, at least some of the optical imaging sensors are attached to a tower supporting the wind turbine. In some variations one or more of the optical imaging sensors is arranged with a field of view directly above the wind turbine.

In another aspect, an automated system for surveying the population of birds or bats of one or more particular species of interest comprises a plurality of optical imaging sensors and a controller. The controller is configured to automatically receive and analyze images from the optical imaging sensors and to automatically determine whether birds or bats detected in images from the optical imaging sensors are members of the one or more particular species of interest. The particular species of interest may comprise, for example, Bald Eagles and/or Golden Eagles.

In one embodiment, an automated system for mitigating risk from a wind farm is described. The automated system may include an array of a plurality of image capturing devices independently mounted in a wind farm. The array may include a plurality of low resolution cameras and at least one high resolution camera. The plurality of low resolution cameras may be interconnected and may detect a spherical field surrounding the wind farm. A server may be in communication with the array of image capturing devices. The server may automatically analyze images to classify an airborne object captured by the array of image capturing devices in response to receiving the images.

The array of image capturing devices may coordinate the capturing of a stereoscopic image of the airborne object. The server may be connected to a plurality of wind towers, wherein the server may be capable of initiating mitigation efforts of the wind towers. The mitigation activities may curtail functionality of blades of the wind tower. The mitigation activities may initiate one or more deterrent activities, wherein the deterrent activities may include flashing lights and sounds.

A plurality of towers may be strategically placed around the wind farm to provide 360 degrees of optical coverage of each wind tower in the wind farm. The plurality of towers may be equipped with the plurality of image capturing devices. The plurality of towers may be equipped with meteorological instrumentation, the meteorological instruments may be connected to the server. The meteorological instruments may stream weather conditions to the server. The server may be configured to use the weather conditions to aid in identifying a behavioral pattern to classify the flying object.

A radar system may be proximate the at least one high resolution camera. The at least one high resolution camera may be equipped with a pan and tilt system capable of near 360 motion. An observation zone may surround each plurality of image capturing devices, wherein each observation zone may overlap. The array may further include at least one wide view imaging system, the wide view imaging system may comprise a view range between 180 degrees and 90 degrees.

In another embodiment, a method of mitigating risk from a wind farm is described. The method may include detecting one or more airborne objects through a low resolution camera, activating a high resolution camera to provide improved imagery, and transmitting, automatically through a computing device, improved imagery data to a cloud server. The method may include classifying, through the cloud server, the airborne object based at least in part on the improved imagery, monitoring the airborne object with the high resolution camera as it enters a wind farm based at least in part on the classification when the airborne object is classified as at least one of the predetermined species. The method may also include activating mitigation efforts within the wind farm when the flying object meets a threshold classification and a threshold location.

The method may further include gathering one or more meteorological data points from one or more meteorological instruments proximate the high resolution camera and transmitting the meteorological data points to a cloud server. A cloud server may analyze a behavior of the flying object based at least part on the meteorological data points. Image data and meteorological data points may be streamed to the cloud server. The cloud server may update a travel trajectory of the flying object and a behavioral categorization based at least in part on the streaming data.

Activating mitigation efforts may further include curtailing, automatically, operation of a wind tower based at least in part on the threshold classification and threshold location. The threshold location may comprise a predetermined distance from a wind tower based at least in part on a travel trajectory of the flying object and a travel speed of the flying object. An event log may be generated when a flying object enters the wind farm. The event information may be recorded including object classification, travel information, and mitigation efforts relating to the event. The event information may be stored in a cloud server for a predetermined period of time. A location of the airborne object may be determined using a radar system proximate the high resolution camera.

In another embodiment, an automated system for mitigating risk from a wind farm is described. The automated system may include a plurality of image capturing devices independently mounted on a detection system tower in a wind farm. The plurality of image capturing devices including a plurality of low resolution cameras and at least one high resolution camera. The plurality of low resolution cameras may be interconnected and may detect a spherical field surrounding the wind farm. A server may be in communication with the array of image capturing devices. The server may analyze images to classify a flying object captured by the array of imaging capturing devices in response to receiving the images.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIG. 5 shows an exemplary view of a wind turbine to which optical imaging sensor modules are mounted according to an example bird or bat risk mitigation methods and systems disclosed herein.

FIG. 6 shows an exemplary view of a wind turbine to which optical imaging sensor modules are mounted according to an example bird or bat risk mitigation methods and systems disclosed herein.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will enable one skilled in the art to make and use the invention, and describes several embodiments, adaptations, variations, alternatives and uses of the invention.

For the purposes of this disclosure, the term "airborne object" generally refers to animals or objects that employ aerial locomotion. This aerial locomotion may be powered or unpowered. These airborne objects may include flying or gliding objects or animals such as birds, bats, insects, other types of mammals, other types of birds, drones, aircraft, projectiles, other types of airborne objects, or combinations thereof.

Figure 1:
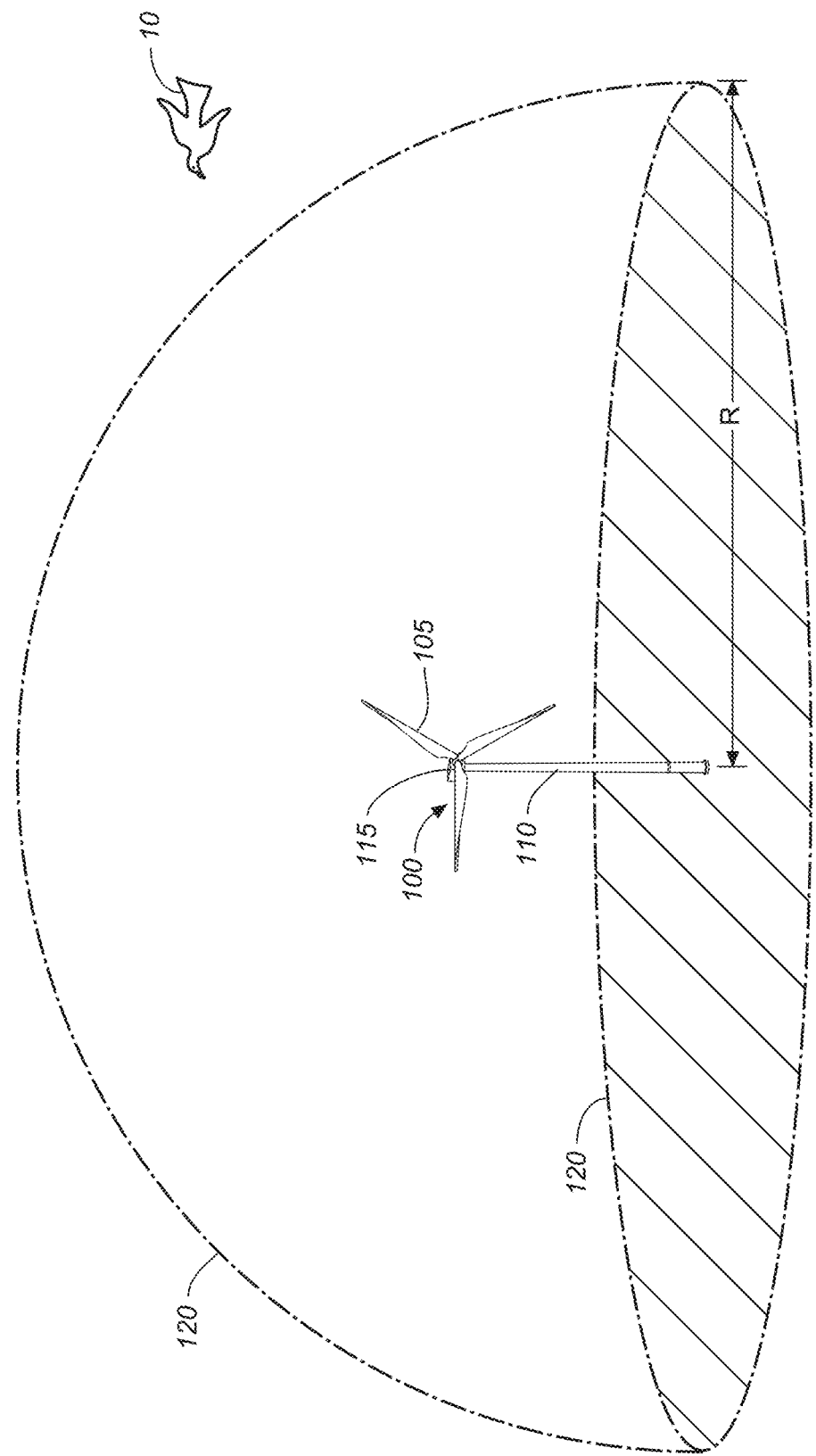
FIG. 1 is an exemplary side perspective view of a wind turbine illustrating a volume of space around the wind turbine defined by an example bird or bat risk mitigation methods and systems disclosed herein.
Figure 2:
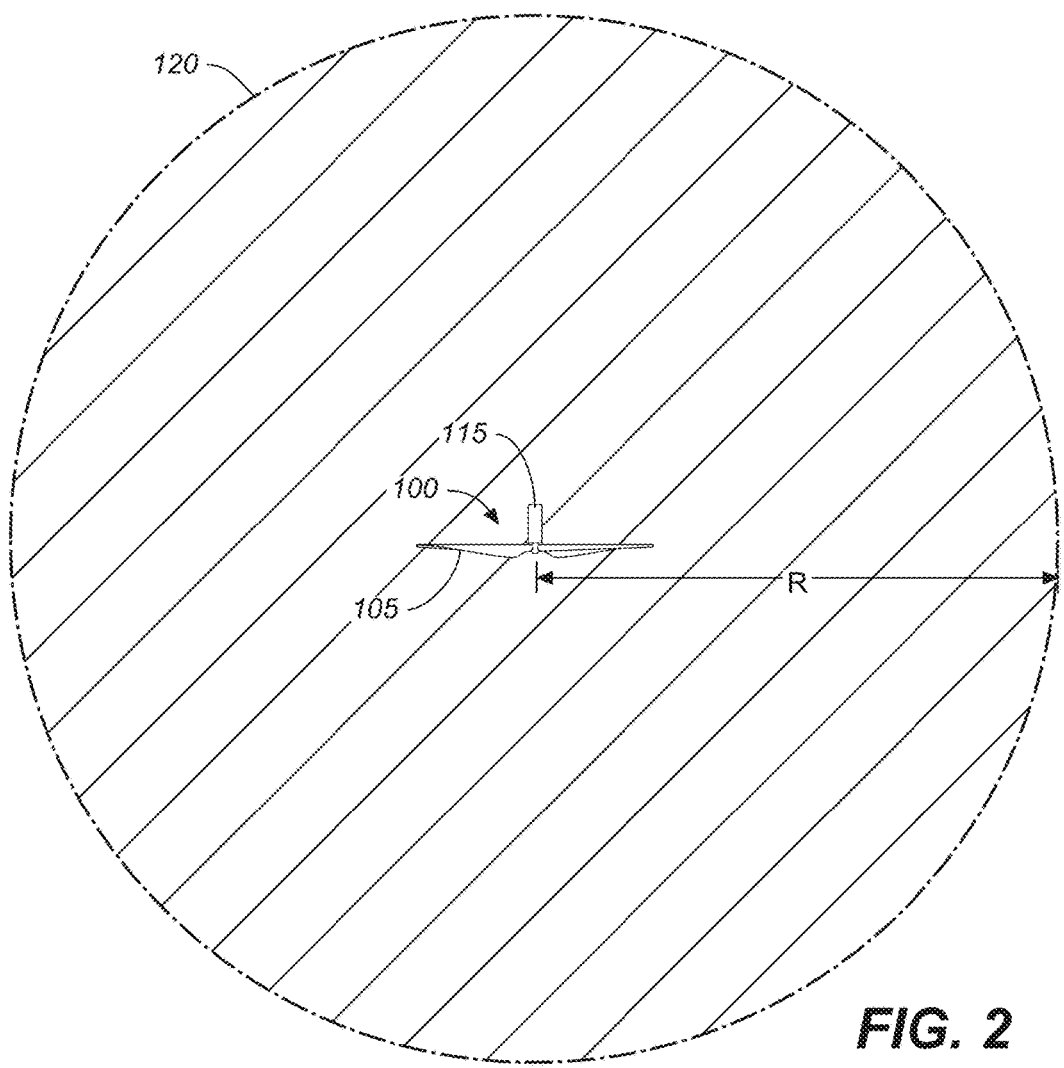
FIG. 2 is an exemplary top perspective view of the wind turbine and bird or bat risk mitigation volume illustrated in FIG. 1.

Referring to FIG. 1 (side view) and FIG. 2 (top view), this specification discloses automated systems and methods that employ optical imaging technology to detect birds, bats, or other types of objects (e.g., bird 10) in flight near a wind turbine 100, determine whether or not the detected bird, bat, or object is of one or more particular protected species or group requiring risk mitigation (e.g., a Golden Eagle, a Bald Eagle, government drone), and based on that determination decide whether or not to curtail operation of the wind turbine 100 and/or whether or not to employ deterrent measures to deter the detected bird, bat, or object from approaching the wind turbine 100. The systems and methods may, for example, positively identify a detected bird, bat, or object to be a member of a protected species or group for which risk is to be mitigated, positively identify a detected bird, bat, or object to be a member of a species for which risk need not be mitigated, or determine that a detected bird, bat, or object is not a member of a protected species or group for which risk is to be mitigated without identifying the species of the bird, bat, or object. In some cases, a protected species is defined by a government in which jurisdiction the wind farm is located. But, in other examples, the system may include a list of species that it classifies as a "protected species." In other examples, the species that are considered to be a protected species may be based on international treaties, non-governmental organizations, protection groups, industry experts, scientific studies, religious groups, other individuals, other organizations, or combinations thereof.

In these systems and methods the birds, bats, or object may be first imaged at a distance from the wind turbine 100 greater than or equal to a distance R, and the decisions to curtail or not to curtail operation of the wind turbine 100 and to deploy or not to deploy deterrent measures may be made before the bird, bat, or object approaches closer than distance R to the wind turbine 100. The distance R is selected to provide sufficient time for operation of the wind turbine 100 to be curtailed before the detected bird or bat is likely to reach the volume swept by the wind turbine blades 105, if the bird, bat, object is flying toward the wind turbine 100 at a speed characteristic of a protected species for which risk is to be mitigated. A characteristic speed of a bird or bat species may be, for example, an average horizontal flight speed or a maximum horizontal flight speed.

Hence the distance R may be selected, for example, to be greater than or equal to the distance that a bird or bat of the protected species for which risk is to be mitigated can fly at that species' known average horizontal flight speed in the time interval required to curtail operation of the wind turbine 100. Alternatively, the distance R may be selected for example to be greater than or equal to the distance that a bird or bat of the protected species for which risk is to be mitigated can fly at that species' known maximum horizontal flight speed in the time interval required to curtail operation of the wind turbine.

If the methods and systems are used to mitigate risk from the wind turbine 100 for more than one protected species of bird and/or bat, R may be determined for example using a characteristic speed of the fastest of the protected species for which risk is to be mitigated. Alternatively, a separate distance R may be determined for each protected species for which risk is to be mitigated.

The distance R may be measured for example from near the base of the wind turbine tower 110 as shown in FIG. 1, from the wind turbine nacelle 115, or from any other suitable location on the wind turbine or its support structure. R may conveniently be measured from at or near the location of one or more optical imaging sensors (further described below) employed in the systems and methods, but this is not required. In the illustrated example, R defines the boundary of a substantially hemispherical mitigation volume 120 around the wind turbine 100. Similar protocols may be employed for determine the speed of approaching airborne objects.

Wind turbines with which the systems and methods of this disclosure may be employed may have tower 110 heights of, for example, about 60 meters to about 120 meters and blade 105 lengths of, for example, about 40 meters to about 65 meters. Rotation of the blades 105 of such wind turbines 100 may be reduced from a normal operating speed of, for example, about 6 to about 20 revolutions per minute (rpm) o about 1 rpm or less (e.g., to 0 rpm) in a time period (curtailment time) of, for example, less than about 20 seconds, or less than about 30 seconds. A rotation speed of about 1 rpm or less for such wind turbines 100 may be deemed by regulatory authorities to pose an acceptable risk to government-protected bird and bat species. Full curtailment to 0 rpm may be preferable and obtainable in these time intervals. While the above examples have been described with a specific type of windmill tower, any appropriate type of windmill tower may be used in accordance with the principles described in the present disclosure. For example, the tower height may exceed 120 meters and/or the blade length may exceed 65 meters. Further, the normal operating speed of the wind turbines and the curtailment speeds may be outside of the parameters described above. Also, the windmill's turbines may operate at the curtailment speeds for any appropriate amount of time.

As examples, Golden Eagles have an average horizontal flight speed of about 13.5 meters/second and Bald Eagles have an average horizontal flight speed of about 18.0 meters/second. Using these speeds, a value of R equal to about 800 meters would provide about 44 seconds in which to curtail the wind turbine 100 for a Bald Eagle and about 59 seconds in which to curtail the wind turbine 100 for a Golden Eagle. A value of R equal to about 600 meters would provide about 33 seconds in which to curtail the wind turbine 100 for a Bald Eagle, and about 44 seconds in which to curtail the wind turbine 100 for a Golden Eagle. These values for R thus likely provide sufficient time in which to curtail operation of a wind turbine 100 to about 1 rpm or less (e.g., to about 0 rpm), and hence are likely suitable for mitigating risk to Golden Eagles and Bald Eagles using the systems and methods of the present disclosure.

Figure 7:
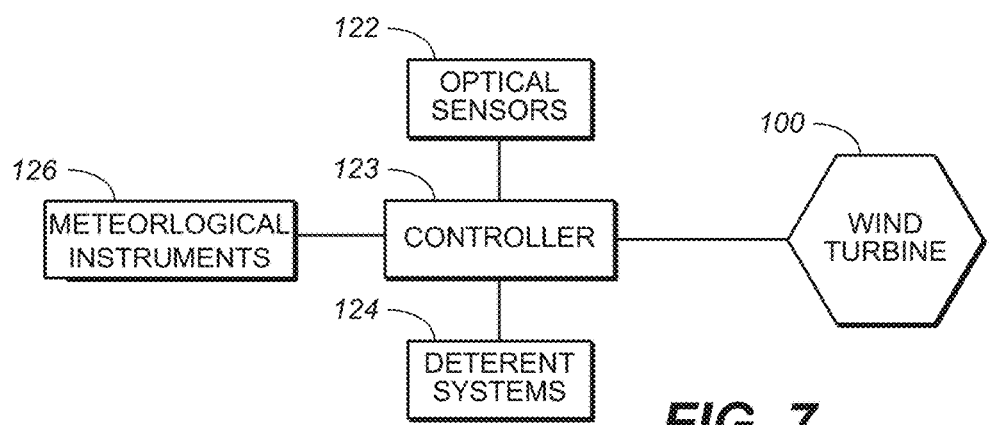
FIG. 7 shows an example block diagram of a system for mitigating risk from a wind turbine to birds or bats disclosed herein.

Referring now to the schematic block diagram of FIG. 7, the bird and bat risk mitigation systems of the present disclosure may include one or more optical sensors (e.g., digital cameras) 122 located on or near a wind turbine 100, one or more bird, bat, and/or object deterrent systems 124, one or more meteorological instrumentation 126, and one or more controllers 123 in communication with the wind turbine 100, the optical sensors 122, meteorological instruments 126, and the deterrent systems 124. The optical sensors 122 image birds and/or bats in flight near the wind turbine 100 and provide the images to the controller 123. The controller 123 may implement an algorithm that determines whether or not an imaged bird or bat is of one or more particular protected species requiring risk mitigation and whether or not the imaged bird or bat is approaching the wind turbine 100. If the controller 123 determines that an imaged bird or bat is of a protected species for which risk is to be mitigated, and determines that the imaged bird or bat is approaching the wind turbine 100 or is likely to approach dangerously close to the wind turbine 100, the controller 123 signals the wind turbine 100 to curtail operation, or signals the deterrent system 124 to deploy deterrent measures to deter the bird or bat from further approaching the wind turbine 100, or signals the wind turbine 100 to begin curtailing its operation and signals the deterrent system 124 to deploy deterrent measures.

For example, the controller 123 may determine that an imaged bird or bat is of one or more protected species requiring risk mitigation and is approaching the wind turbine 100. While the bird or bat is still at a distance greater than R (defined above), the controller 123 may signal a deterrent system 124 to deploy a deterrent measure in an attempt to deter the bird or bat from further approaching the wind turbine 100. If the controller 123 determines from further images from the optical sensors 122 that the bird or bat was successfully deterred from further approaching the wind turbine 100, the controller 123 may then determine that it is not necessary to curtail operation of the wind turbine 100. If the controller 123 determines instead that the deterrent measures were not successful and that the bird or the bat continues to approach the wind turbine 100, the controller 123 may signal the wind turbine 100 or a wind farm operator to curtail operation. The controller 123 may, for example, in addition control the deterrent system 124 to continue to deploy deterrent measures while the bird or bat is within a distance R of the wind turbine 100. If operation of the wind turbine 100 is curtailed, after the controller 123 determines from further images from the optical sensors 122 that the bird or bat has left the proximity of the wind turbine 100 and is no longer at risk the controller 123 may signal the wind turbine 100 to resume normal operation and signal the deterrent system 124 to cease deploying deterrent measures.

In some examples, the signals may be sent directly to a windmill to initiate either the deterrent operations or the curtailment operations. In other examples, the signals may be sent to an operator of the windmills where the signals provide information that can be used by the operator to decide whether to send commands to the windmill to initiate the deterrent system or the curtailment system. In these examples, these signals may include details about whether a criterion for determent or curtailment has been met. For example, the signal may include a message explaining a bird is within 600 meters of a particular turbine. In that situation, the operator may study the behavior of the bird through the cameras in the windfarm and decide whether to initiate the curtailment or determent operations. In other examples, the signal may include a message that includes a recommendation with the details about the criterion. In this situations, the operator can still decide whether to send commands to the turbine to execute the determent and/or curtailment operations. In one such example, the message may explain that a bird is within 600 meters of the turbine and is kiting-soaring with tis head down in hunting mode, which meets the curtailment prescription. In another example, the signal may include a message that explains that a bird is within 600 meters of the turbine and is unidirectional flapping-gliding with its head up, which is interpreted to be in safer status and curtailment prescriptions are not met. In each of these situations, the operator may make the decision to take further action. But, in other examples, the signals may be sent directly to the windmills of interest without a human making a decision.

The system just described may employ deterrent measures and may curtail operation of a wind turbine to mitigate risk to a bird or bat of a predetermined protected species. Other variations of such systems may be configured only to employ deterrent measures as described above and not to curtail operation of the wind turbine. Yet other variations of such systems may be configured to curtail operation of a wind turbine as described above, but not to employ deterrent measures.

Optical sensors 122 employed in these systems may include, for example, one or more wide angle field of view (WFOV) cameras mounted with fixed fields of view for object detection and two or more high resolution cameras mounted to pan and tilt so as to be capable of tracking and identifying a bird or bat as it approaches or passes near the wind turbine 100. The WFOV cameras may be arranged so that their combined fields of view provide 360 degrees of coverage in many directions around the wind turbine 100. Thus, the combined fields may include a spherical vision around the windfarm. The cameras may have the ability to move to tilt upward, tilt downward, rotate, or otherwise move. One or more additional WFOV cameras may be arranged with their fields of view pointed upward to provide, in combination with the other WFOV cameras, substantially hemispherical coverage as depicted in FIG. 1 in the mitigation volume (e.g. 120). The tracking cameras may be arranged to enable tracking and identification of birds or bats in the combined field of view of the WFOV cameras.

The WFOV cameras may be configured to image birds or bats for which risk is to be mitigated at a distance greater than R (defined above), for example at a distance between about 600 meters and about 1000 meters, to provide at least a low resolution blob-like image of the bird or bat. The WFOV cameras may additionally recognize other flying objects and have the capability of initially determining if the flying object is an animal or a non-living object.

The panning high resolution cameras are configured to image the detected birds or bats at a distance greater than R (e.g., between about 600 meters and about 1000 meters) with sufficiently high resolution to provide information on size, shape, color, flight characteristics, and/or other features by which it may be determined whether or not the imaged bird or bat is a member of a protected species for which risk is to be mitigated. The panning high resolution cameras may be arranged (e.g., in pairs) with overlapping fields of view to provide stereoscopic imaging of the birds or bats from which the distance to the bird or bat and its speed and direction of motion (velocity) may be determined. While these examples have been described with specific detection distances, any appropriate detection distances may be used in accordance with the principles described in this disclosure. For example, the WFOV optical imaging sensors, the high resolution cameras, or the low resolution cameras may be able to capture images of the airborne objects at distances greater than a 1000 meters. In some examples, the high resolution camera can capture images of airborne objects in distances between 1000 and 10000 meters.

Any suitable cameras or other optical imaging sensors 122 may be employed for the WFOV optical imaging sensors and the panning optical imaging sensors. The optical imaging sensors may generate images from visible light, but the optical imaging sensors may additionally and/or alternatively be configured to image birds or bats at infrared wavelengths to provide images at night.

In some variations, an optical sensor 122 includes one or more WFOV cameras arranged to provide general object or blob-like visual detection and two or more high resolution cameras arranged to provide stereoscopic imaging from overlapping fields of view to track birds or bats flying in the field of view of the WFOV cameras. Two or more such modules may be deployed on or around a wind turbine to provide the 360 degree coverage described above.

The meteorological instrumentation 126 may measure climate conditions to predict and/or identify the bird or bat or the behavior of the creature. The meteorological instruments 126 may include at least one of a barometer, ceilometer, humidity detector, rain and precipitation sensor, visibility sensor, wind sensor, temperature sensor, and the like. Specific environmental and climate conditions may determine animal behavior. For example, wind speed and temperature conditions may affect bat feeding behavior. The metrological instrumentation 126 may also collect seasonal information.

Any suitable controller 123 may be used to control bird and/or bat risk mitigation for the wind turbine. The controller 123 may include, for example, a processor and associated memory and input/output ports or wireless receivers and transmitters configured to communicate with the wind turbine 100, the optical sensors 122, the meteorological instruments 126, and the deterrent system 124. The controller 123 may be or include a programmable computer, for example. The system may include a separate controller for each wind turbine. Alternatively, a single controller 123 may control risk mitigation for two or more wind turbines. A controller 123 may be located on a wind turbine, or anywhere else suitable. A controller 123 may communicate with its associated optical sensors 122 and wind turbine 100 (or wind turbines) wirelessly, or through optical or electrical cable for example. The controller 123 may additionally tap into a fiber system associated with the wind tower 110 and wind farm.

The controller 123 may implement an algorithm in which it receives from the WFOV camera or cameras images in which it detects a bird or bat at a distance greater than R from a wind turbine 100. The controller 123 then controls the one or more high-resolution tracking (e.g., pan/tilt) cameras to track the bird or bat and collect and analyze high resolution images from which the controller 123 determines the distance to the bird or bat, its speed and direction of travel, and its height above ground level. The controller 123 may also determine from the high resolution images whether or not the bird or bat is of a protected species for which risk is to be mitigated (e.g., whether or not it is a Golden Eagle or a Bald Eagle). The controller 123 may make the determination based on color, shape, size (e.g., wing span), flight characteristics (e.g., speed, wing motion and/or wing beat frequency), and/or any other suitable features of the bird or bat. If the bird or bat is a member of a protected species for which risk is to be mitigated and is approaching dangerously close to the wind turbine 100 or likely to approach dangerously close to the wind turbine 100, the controller 123 signals the wind turbine 100 to curtail operation and/or signals a deterrent system 124 to deploy a deterrent measure as described above. If operation of the wind turbine 100 is curtailed, after curtailing the wind turbine 100, the controller 123 may continue to track the bird or bat with one or more tracking high-resolution cameras through the optical sensors 122 and collect and analyze images of the bird or bat from the one or more WFOV cameras and the one or more tracking high-resolution cameras until the bird or bat is no longer at risk from the wind turbine 100. For example, until the bird or bat is sufficiently far from the wind turbine 100 (e.g., >R) and moving away from the wind turbine 100. When the bird or bat is no longer at risk, the controller 123 signals the wind turbine 100 to resume normal operation.

The controller 123 may additionally receive information from the meteorological instruments 126 to help determine the behavior of the bird or bat. The types of weather conditions collected by the meteorological instrumentation 126 may provide additional information to the controller 123 to determine if the bird or bat will undertake avoidance measures. Wind speed and temperature conditions may be particular to bat feeding behavior. Seasonal information may be indicative of migratory behavior. Other factors may also be indicative of migratory behavior such as the nature of the airborne object's flight, flight patterns, other factors, or combinations thereof.

The controller 123 may use the additional information to make inferences on the behavior of the bird or bat. For example, a hunting bird or bat may be at higher risk for collision with a wind tower 110. The hunting behavior may cause the creature to not notice the wind tower 110 and may create an increased risk. The controller 123 may initiate curtailment and deterrent system 124 sooner if a hunting behavior is detected. Alternatively, if the controller 123 determines the bird or bat is in a migratory or travel pattern, the controller 123 may delay curtailment and deterrence. The migratory and/or traveling creature may be more likely to notice the wind tower 110 and naturally avoid the structure. The behaviors of the bird may be classified to assist in determining whether the birds are demonstrating hunting behavior, migratory behavior, other types of behavior, or combinations thereof. Examples of behavior categories may include perching, soaring, flapping, flushed, circle soaring, hovering, diving, gliding, unidirectional flapping-gliding, kiting-hovering, stooping or diving at prey, stooping or diving in an agonistic context with other eagles or other bird species, undulating/territorial flight, another type of behavior, or combinations thereof. Behavior and activity prevalent during predetermined intervals (e.g. one minute intervals) can recorded as part of an information gathering protocol. As the bird's behavior is followed over a predetermined amount of time, the bird's behavior type can be predicted.

Deterrent system 124 may be configured to deploy bird and/or bat deterrents. This deterrents may include flashing lights and sounds to deter bird, bats or other animals. The deterrent system 124 may include lights, sounds, radio transmissions, or other types of signals inanimate airborne objects.

In one variation of the systems and methods just described, the WFOV cameras may detect and image birds that may be Golden Eagles or Bald Eagles at a distance of about 1000 meters or more from the wind turbine 100. After or upon detection of the bird with the WFOV cameras, one or more tracking high resolution cameras may begin tracking the bird at a distance of about 800 meters or more from the wind turbine 100. Based on the images from the WFOV and tracking cameras, the controller 123 determines whether or not to curtail operation of the wind turbine 100 and/or whether or not to deploy deterrent measures, and accordingly signals the wind turbine 100 and/or the deterrent system 124 before the bird is closer than about 600 meters to the wind turbine 100.

With the systems and methods of the present disclosure, wind turbines in a wind farm may be individually curtailed and then returned to normal operation as a protected bird or bat for which risk is to be mitigated passes into and out of the individual wind turbine mitigation volumes. For example, the wind farm depicted in FIG. 3 includes wind turbines 100a-100e, each having a corresponding mitigation volume 120a-120e. As bird 10 (for this example, a Golden Eagle) flies through the wind farm, it initially approaches wind turbine 100b. Before the bird 10 enters mitigation volume 120b, it is identified as a Golden Eagle and wind turbine 100b is instructed to curtail operation. As or after the Golden Eagle exits volume 120b toward wind turbine 100d, wind turbine 100b is instructed to resume normal operation. Operation of wind turbine 100d is then similarly curtailed, and then restored to normal after the risk to the Golden Eagle has passed. Operation of wind turbines 100a, 100c, and 100e are not affected by passage of the Golden Eagle.

The systems mounted on the wind tower 110 may require a source of electricity to function. For example, the deterrent system 124, controller 123, optical sensors 122, and meteorological instruments 126 may all be mounted on the wind tower 110. The systems may require electricity to properly function. The electricity may be supplied in a multitude of ways. The systems may tap into the wind tower 110 itself and draw electricity that is generated by the wind tower 110. The systems may be hardwired into an electrical grid which may provide a continuous power source. The systems may additionally be solar powered. The wind tower 110 may be equipped with solar panels which may fuel the systems or the solar panels may be mounted in a nearby location and may be wired to the systems to provide power. Additionally and/or alternatively, the systems may be battery-powered. For example, the systems may run on an independent power system such as a fuel cell or similar battery function. In another embodiment, the systems may draw a primary source of electricity from one of the sources mentioned herein and may draw back-up electricity from a battery. The battery may be supplied by solar panels, the wind tower, and the like and may store excess energy for the systems to use when a main source of power is inadequate or non-functioning. The battery may be located directly on the wind tower 110 or may be located at a nearby location and wired to the systems as appropriate. In yet other examples, the system may be powered by a small wind generator, the grid, a fuel cell generator, another type of generator, batteries, another type of power source, or combinations thereof.

Figure 3:
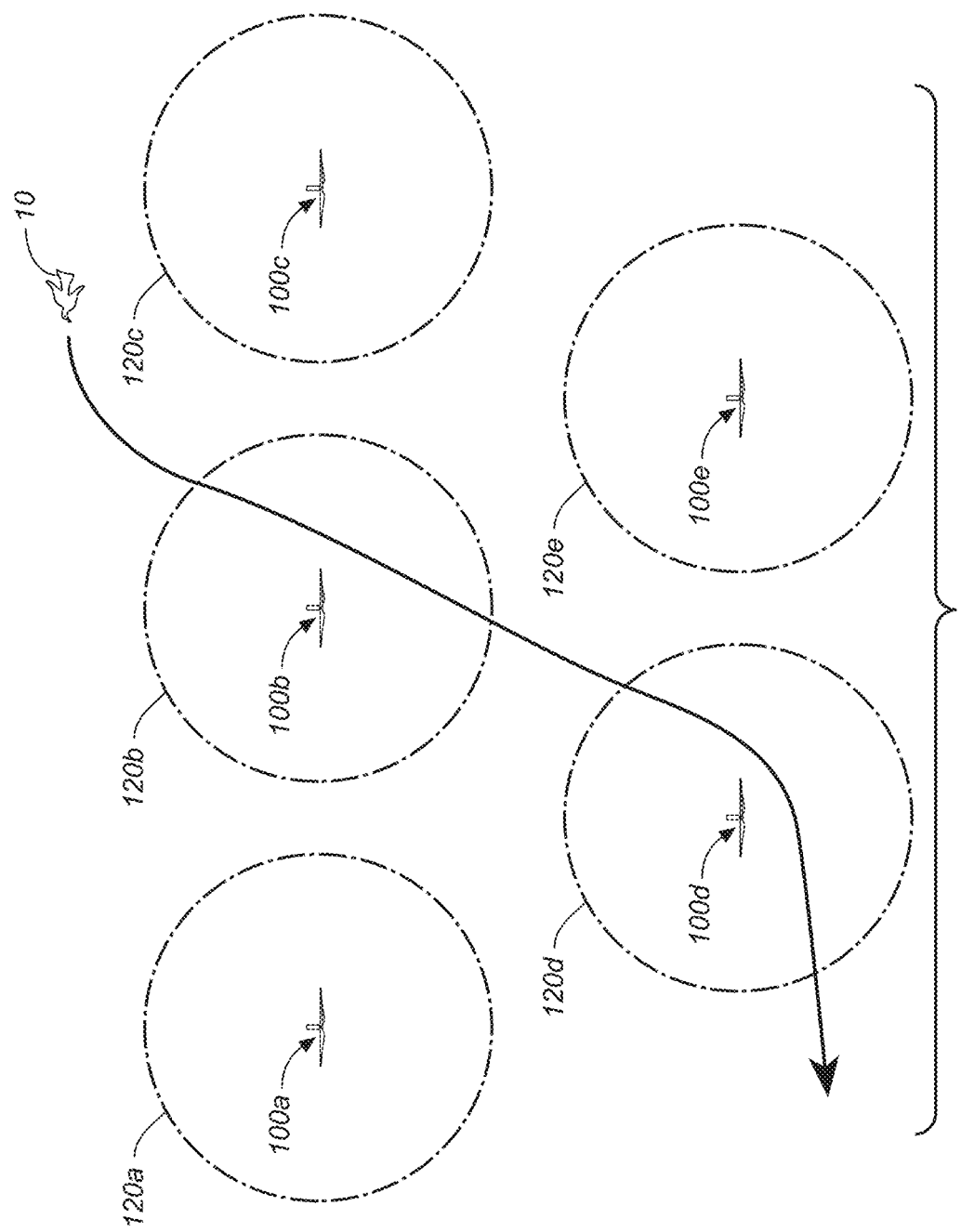
FIG. 3 is an exemplary top perspective view of a wind farm illustrating risk mitigation volumes defined by an example bird or bat risk mitigation methods and systems disclosed herein, as well as the trajectory of a bird flying through the wind farm and triggering curtailment for some wind turbines but not others.

Although in the example of FIG. 3 the diameters of the mitigation volumes are shown as less than the spacing between wind turbines this need not be the case. The mitigation volumes of different wind turbines in a wind farm may overlap.

Figure 4:
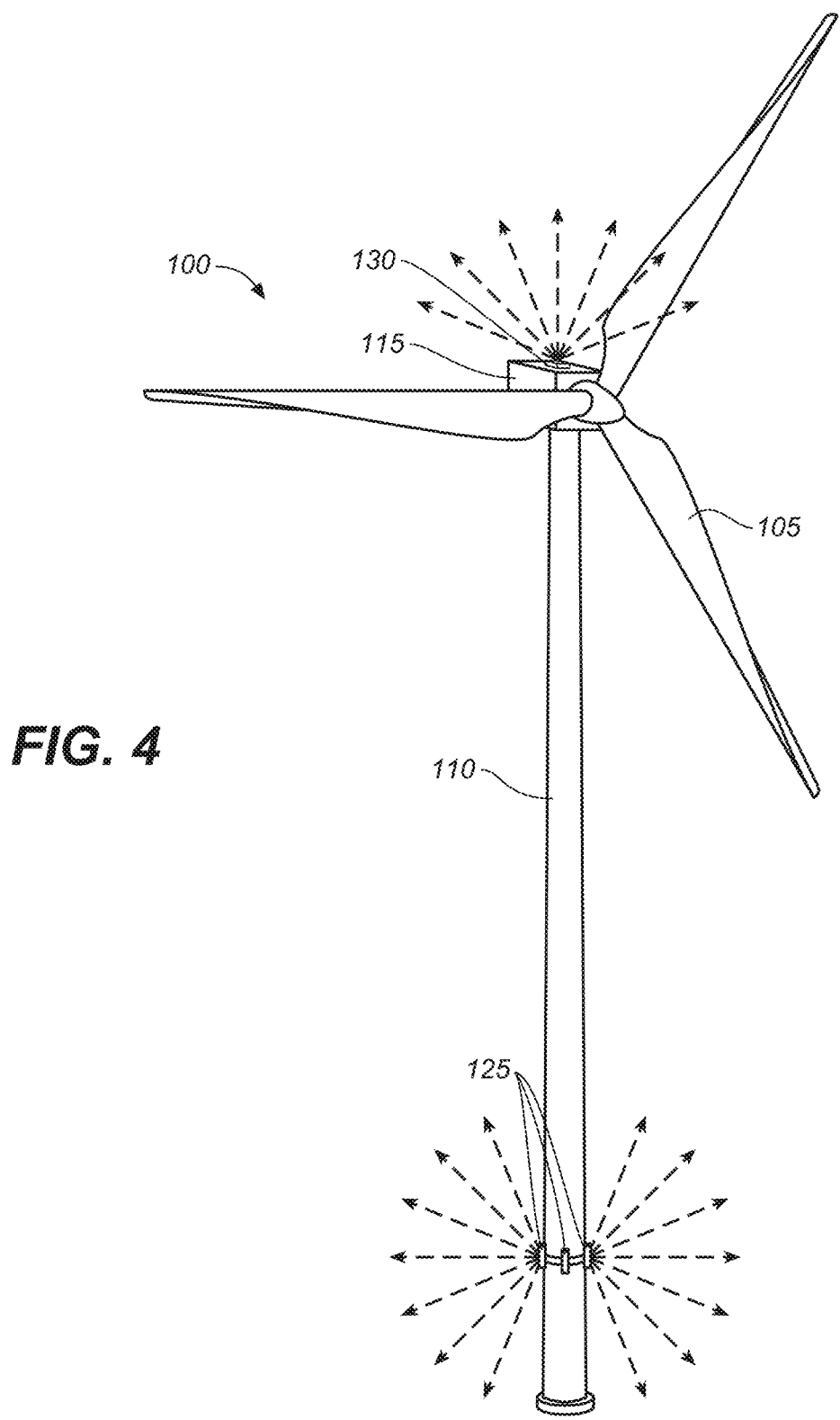
FIG. 4 shows an exemplary view of a wind turbine to which optical imaging sensor modules are mounted according to an example bird or bat risk mitigation methods and systems disclosed herein.

Referring now to FIG. 4 and FIG. 5, some variations of the methods and systems just described employ two or more optical imaging sensor modules 125 attached to a wind turbine tower 110 at a height H above ground level. Height H may be, for example, about 5 meters to about 30 meters, for example about 10 meters. The optical imaging sensor modules 125 are arranged around the wind turbine tower 110 to provide a 360 degree field of view as measured in a horizontal plane perpendicular to the tower 110. The field of view may also include a vertical component so that the airborne objects located higher or lower than the cameras are also detected by the camera. In these examples, the cameras may be located at different heights or have an ability to tilt upwards or downwards. (The arrows shown emanating from the optical imaging sensor modules 125 schematically indicate a portion of their fields of view parallel to the tower 110). The illustrated example employs four such optical imaging sensor modules 125 arranged around the tower 110 with a spacing of about 90 degrees between modules. Any other suitable number and spacing of such optical sensing modules 125 may also be used.

Each optical imaging sensor module 125 may include one WFOV camera and two tracking high resolution cameras arranged with overlapping fields of view to provide stereoscopic imaging and to track birds or bats flying in the field of view of the WFOV camera.

As shown in FIG. 4 and FIG. 6, an additional optical imaging sensor module 130 may be located on top of the wind turbine 100 (e.g., attached to the top of the nacelle 115) with cameras pointed generally upward to provide visual coverage directly above the wind turbine 100. Optical imaging sensor module 130 may be identical to optical imaging sensor modules 125. Alternatively, optical imaging sensor module 130 may differ from modules 125, for example, the optical imagine sensor module 130 may include additional WFOV cameras. Any other suitable arrangement of optical imaging sensor modules 125, 130 may also be used.

Additional automated systems and methods may employ optical imaging technology similarly as described above to conduct bird and/or bat population surveys prior to or after construction of a wind turbine or wind turbine farm. Such automated surveys may determine, for example, the populations or observations of the presence and movements of particular protected species of birds and/or bats (e.g., Bald Eagles and/or Golden Eagles) in an area in which a wind farm is to be constructed or has already been constructed. A decision as to whether or not to construct a wind farm may be based or partially based on the results of such an automated survey. Similarly, a decision as to whether or not to install a risk mitigation system at a proposed or an existing wind farm, such as those described above for example, may be based or partially based on such an automated survey. Such systems and methods may be employed for onshore and/or offshore wind sites.

Such an automated bird and/or bat surveying system may include, for example, one or more WFOV cameras as described above, and two or more tracking high-resolution cameras arranged as described above to track birds or bats in the field of view of the one or more WFOV cameras. For example, the system may include one or more optical sensor modules 125 as described above. The system may also comprise a controller, for example similar to controller 123 described above, in communication with the cameras. The controller may implement an algorithm in which it receives from the WFOV camera or cameras images in which it detects a bird or bat. The controller may then control the one or more high-resolution tracking (e.g., pan/tilt) cameras to track the bird or bat and collect and analyze high resolution images from which the controller determines whether or not the bird or bat is of a particular species of interest (e.g., a protected species for which risk is to be mitigated). The controller may make that determination based, for example, on color, shape, size (e.g., wing span), flight characteristics (e.g., speed, wing motion and/or wing beat frequency), and/or any other suitable features of the bird or bat. For example, the controller may determine whether or not a detected bird is a Golden Eagle or a Bald Eagle. If the detected bird or bat is a member of the species of interest, the controller may for example record images of and information about the detected bird or bat on a hard drive or in other memory medium, or transmit such images and/or information to another device for storage. The controller may for example count the number of instances in which birds or bats of the particular species of interest are detected.

Figure 8:
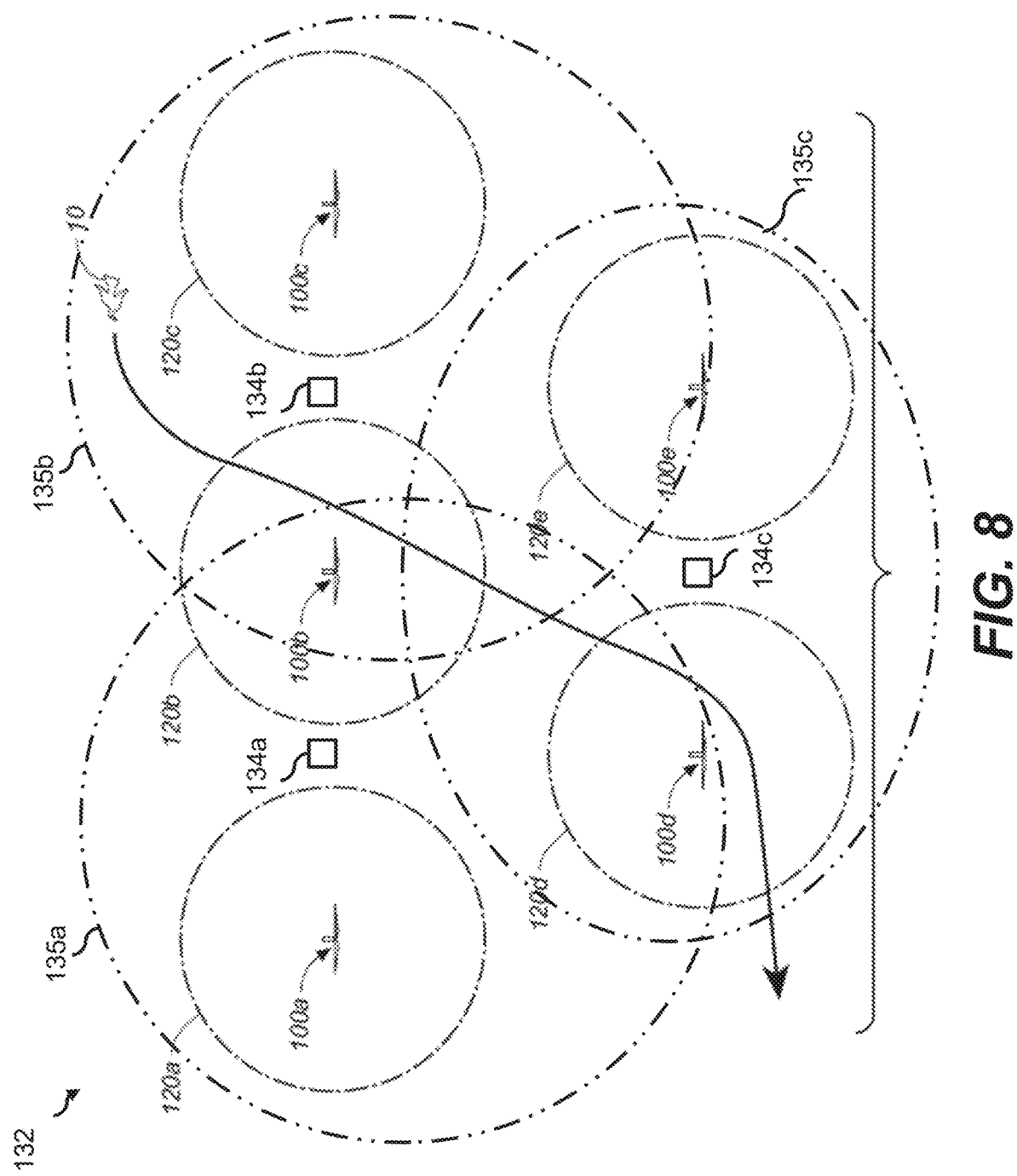
FIG. 8 is a top perspective view of an example of a wind turbine farm with an array of image capturing devices disclosed herein.

In the embodiments described above, a detection system may be individually installed on each wind tower. In another embodiment, as shown in FIG. 8, a detection system 134 may be independently mounted in a wind farm 132. For example, each detection system 134 may have its own tower, without any turbine blades, on which it is mounted. The detection system 134 may be scattered throughout the wind farm 132 to provide comprehension detection coverage for birds and bats. The detection system 134 may be strategically placed to provide maximum detection capabilities without the need of duplicative systems. This may reduce a cost associated with installing and maintaining the detection systems. For example, as shown in FIG. 8, there are five wind towers but only three strategically place detections system 134. An observation zone 135 coverage area 135 for each tower encompasses the entirety of the wind farm 132.

The location of the detection system 134 may depend upon the location of a wind tower 110, local topography, weather conditions, visibility conditions, and the like. The local topography may determine where a detection system 134 may be mounted, the visibility surrounding the detection system 134, and the like. The detection system 134 may be placed to provide optimal vision of the wind farm 132 and the mitigation volume 120 surrounding each wind tower 110. The visibility may additionally or alternatively be determined by local manmade structures such as buildings, or natural features such as trees, hills, mountains, and the like. Additionally, the local topography may also dictate a mounting surface for a tower for the detection system 134. The detection system tower (e.g. detection system tower 136 discussed with reference to FIG. 9) is mounted on the surface of the earth to provide a stable structure. The topography may allow for the drilling, mounting, and interface of the tower to the earth's surface and may additionally dictate location of the detection system tower 136.

Power and data connectivity may also influence the location of a detection system 134. As mentioned previously, the detection system 134 may be powered one of several ways. For example, the detection system 134 may use solar power, may tap into the wind tower electrical system, may use a battery such as a fuel cell or the like. Depending upon the type of power desired and the environmental conditions may dictate the location of the detection system 134. Additionally, the detection system 134 may connect to a central database to one or more other detection systems. The detection system may use a wired or wireless system to connect to the other portions of the system. The type of connectivity may determine the location of the detection system 134.

Figure 9:
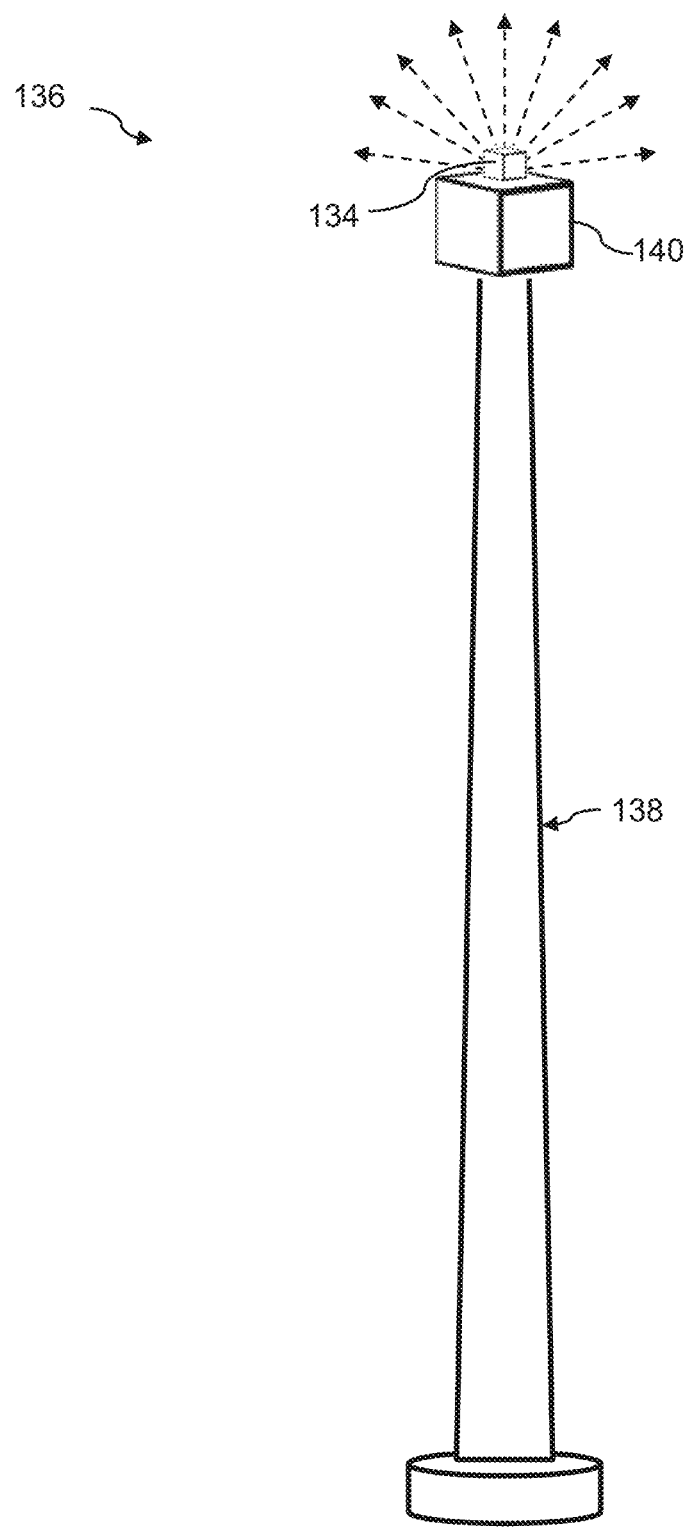
FIG. 9 shows an exemplary view of a detection system tower disclosed herein.

As shown in FIG. 9, the detection system tower 136 may resemble wind turbine tower (e.g., wind turbine tower 110, FIG. 1). The height of the detection system column 138 may be at least 5 meters high. The height of the column 138 may vary depending upon the mounting location, visibility, and other factors discussed with reference to FIG. 8. The column 138 may include a mounting platform 140 which provide a stable surface for the detection system 134.

Each tower 136 may include a detection system 134 with a series of low resolution and high resolution imaging systems. The low resolution imaging system may include wide view lenses to provide 360 degree imaging coverage surrounding the tower 136. The number of low resolution imaging systems to accomplish this may vary. In one embodiment, six low resolution imaging systems may provide total coverage. In another embodiment, more or less low resolution imaging systems may be mounted to provide complete coverage. In still another embodiment, the tower 136 may coordinate coverage with another tower 136. Therefore, the individual tower may not have 360 degree coverage but, in combination with an array of detection system towers 136, the entire wind farm (e.g., wind farm 132) may be covered with image capturing devices.

Each tower 136 may additionally include at least one high resolution imaging system. In some embodiments, multiple high resolution imaging systems may be mounted. The number of high resolution imaging systems individually mounted on the tower 136 may depend upon the location of the tower 136 in relation to other detection system towers 136 and the wind farm 132 in general. The high resolution imaging system may include stereoscopic technology. Stereoscopic technology may combine the use of multiple photographs of the same object taken at different angles to create an impression of depth and solidity. The high resolution imaging system may use at least two high resolution cameras mounted on a single tower, or may combine imagines from multiple detection system towers to provide the same or similar information. The stereoscopic technology may provide a better image of a bird or bat which may provide more efficient recognition capabilities. The recognition capabilities, as described previously, may include species of animal, status of animal (i.e., hunting, migrating, traveling, etc.), geographic location, altitude of animal, speed, flight direction, and the like.

The high resolution imaging system may include a pan and/or tilt configuration. For example, the low resolution imaging system may detect a moving object within a predetermined distance from the wind farm 132. The high resolution imaging system may use a pan and/or tilt configuration to isolate the moving object and gather data concerning the object to categorize it. As mentioned previously, the moving object may be a leaf or other nonliving object. Alternatively, the moving object may be a living creature and may be positively identified. The pan and/or tilt feature of the high resolution imaging system may enable more precise images of the object to be captured for further clarification. The high resolution imaging system may maneuver to gain a better image of the object, track the object if the object is moving, and the like. The pan/tilt may allow near 360 motion of the high resolution camera such that the camera is able to capture images of objects within an observation zone 135 surrounding the tower 136. In some instances, the high resolution imaging systems may be equipped with additional capabilities such as a range finder, a radar system, and the like. The additional capabilities may provide more information for potential mitigation efforts.

In one embodiment, the tower 136 may additionally include meteorological instruments and equipment. The meteorological equipment may measure climate conditions to predict and/or identify the bird or bat and the state of the animal. The meteorological instruments and equipment may include barometers, ceilometers, humidity detectors, rain and precipitation sensors, visibility sensors, wind sensors, temperature sensors, and the like. Specific environmental and climate conditions may determine animal behavior. For example, as mentioned previously, wind speed and temperature conditions may affect bat feeding behavior. Seasonal information may also be gathered to help determine animal behavior. A migratory bird is more likely to be seen in the spring and in the fall than in the middle of the winter and/or summer.

In another embodiment, a tower 136 may be equipped either additionally and/or alternatively with wide view imaging systems. The wide view imaging systems may be equipped with a view range between 180 and 90 degrees, and sometimes closer to 120 degrees. The wide view imaging systems may be mounted on a periphery of the wind farm 132 to provide an initial view of birds or bats prior to the animals entry to the wind farm 132 and/or mitigation volume surrounding the wind tower (e.g. mitigation volume 120 surrounding wind tower 110). The wide field tower systems may triangulate between each other to positively capture the field and provide more substantive information to high resolution imaging systems. This type of system may reduce the need for repetitive detection systems and allow a wind farm 132 to provide safe passage for flying animals without undue cost.

The wide field tower systems may additionally use multiple images from multiple towers to determine a location of the flying object and a distance from any of the cameras. For example, by using multiple images, a controller and/or computer system may generate a stereoscopic image which enable the computing device to determine a distance from the flying object to the camera system. Once the location and distance of the flying object is known, a high resolution camera may zoom in on the flying object. The high resolution camera may be enabled with a tilt, zoom, rotatable mounting device, and the like. The high resolution camera may rotate and tilt until it is able to capture an image of the flying object. The computing device may automatically initiate the high resolution camera to move appropriately to capture the flying object or a person may use the information to command the camera. The high resolution camera may capture an image of the flying object. The image captured by the high resolution camera may be a higher quality, for example, the image captured by the high resolution camera may contain more pixels than the images captured by the wide view cameras.

The higher resolution images may enable the computing device and/or a scientist or other personnel to determine characteristics of the flying object. For example, the image may provide information pertaining to the color, size, shape, behavior, and the like. If the flying object is an animal, the characteristics may enable a classification of the object. Alternatively, if the flying object is not an animal, the characteristics may enable personnel and/or a computing device to determine if the flying object poses a threat to the wind farm.

This system may enable a cost savings over traditional systems. Wide field view cameras may spot objects further away and have a greater viewing periphery enabling fewer cameras to be used. The high resolution cameras may be intermittently mounted within the wind farm to provide high resolution coverage. This may reduce the total amount of high resolution cameras. Therefore, this system may reduce the capital required to provide 360 degree photographic coverage of the wind farm by requiring less hardware in the form of camera systems. The fewer camera systems mounted within a wind farm may also reduce the amount of supporting network, further enabling cost savings.

FIGS. 10A-10E are exemplary representations of a graphical user interface (GUI). The GUI may allow a person to interact with the smart detection system. The person may monitor the actions taken by the system and/or override decisions and enter decisions as necessary to provide the safety of a bird or bat and/or to prevent damage to the wind farm. The GUI may be produced by an application program operating on a computing device. The computing device may have at least one display device associated therewith. In some embodiments, the computing device may be associated with multiple display devices. The application may produce an application program window on the display device. In some embodiments, the application program window may be generated by the application program operating on the computing device. The application program window may display the GUI, which communicate select types of information to a view of the GUI.

The computing device may be connected to a remote server over a network. The network may be a cloud computing network. The network may additionally include other networks which work to connect multiple computing devices, servers, and the like. The remote server may be a cloud server or a dedicated server onsite at the physical location of the wind farm.

The GUI may represent one wind farm, or may optionally be connected to multiple wind farms and may alternate or have the ability to alternate between at least a first and second wind farm. Thus, a person, such as a scientist, may interact with the GUI to access multiple wind farms. Accessing multiple wind farms may allow a single scientist to view a plethora of farms without the need to have a scientist employed at each location. The GUI may provide the scientist with the option of overriding or updating information pertaining to events. In some embodiments, the GUI may additionally provide a summary of the wind farm such as name, location, potential species that may be encountered, etc. If multiple wind farms are accessible, the GUI may automatically switch to a wind farm when an event is generated. If multiple events are occurring at once, the GUI may switch between each event location or a second event may be directed to a second GUI. For example, multiple scientists or personnel may be interfacing with the GUI. A first scientist may view a first event, a second scientist may view a second event, and the like.

The application program which displays the graphical interface may be able to automate the mitigation process. For example, the application program may classify the flying object and automatically partake in mitigation and/or deterrent activities as necessary. In some embodiments, the application program may not be accurate. Personnel interfacing with the application program through the GUI may override the application program. For example, the personnel may update and/or correct a classification of the flying object and/or behavioral characteristics of the flying animal.

Figure 10A:
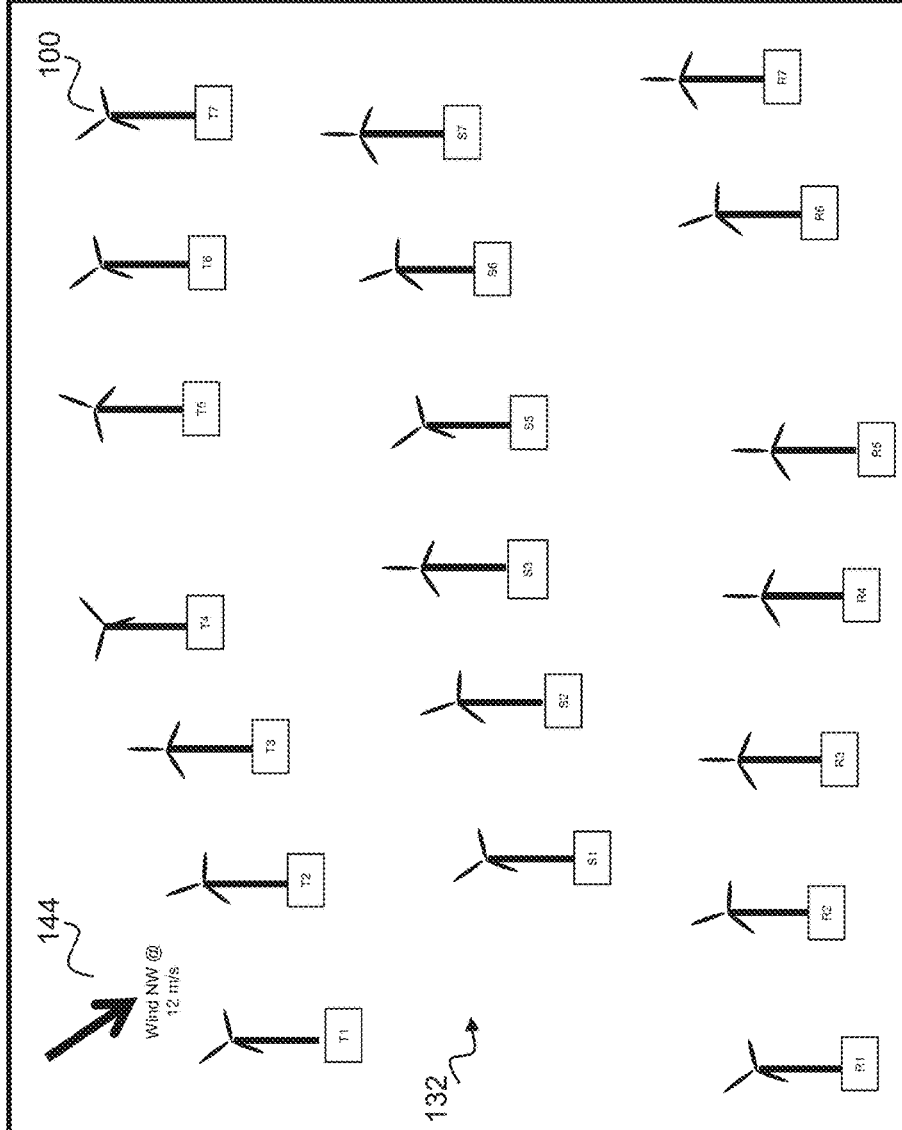
FIGS. 10A, 10B, 10C, 10D, and 10E show an exemplary graphical user interface as disclosed herein.

FIG. 10A depicts an exemplary representation of the GUI 142 for a smart detection system. The GUI 142 may display a wind farm 132. The wind farm 132 may include an individual representation of each wind tower 110. If the system is using a cluster smart detection system, the location of the smart detection systems may also be displayed. The GUI 142 may provide labels for each individual wind tower and smart detection system and may include any meteorological information. For example, FIG. 10A shows a wind speed and direction 144. The GUI may additionally display other meteorological information such as weather conditions (i.e., rain, snow, sleet, etc.) and the like. If a storm front is moving through the region, the storm type may be displayed as well (i.e., hurricane, tornado, blizzard, derecho, etc.).

Figure 10B:
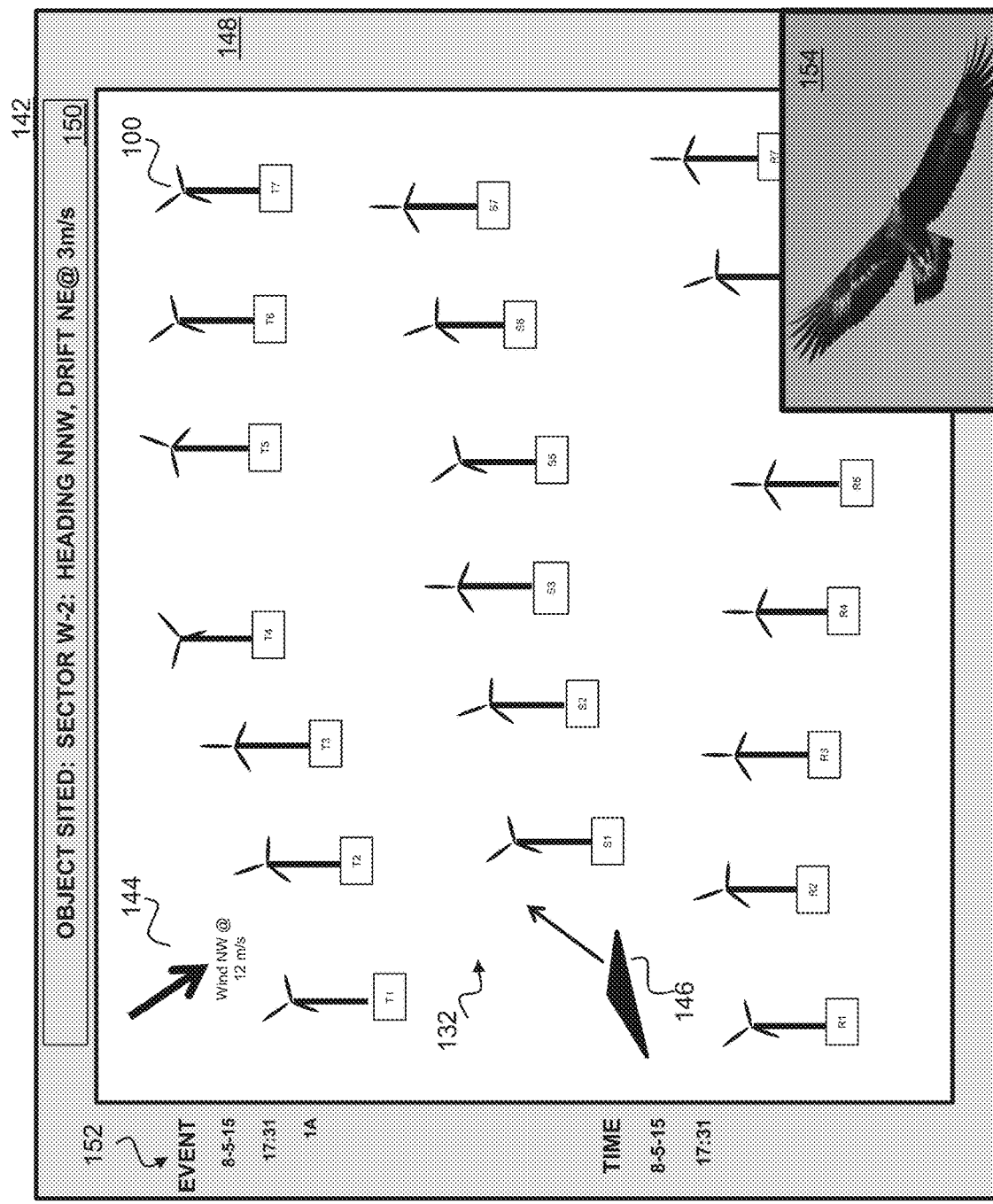

FIG. 10B depicts an exemplary representation of an airborne object sighting. If an object 146 is detected, the screen border 148 may change color to provide a visual alert to an operator. The object 146 may then appear on the GUI 142 displaying a representative size and direction. The GUI 142 may additionally identify a sector the object 146 is traveling in and speed 155. The object 146 sighting may generate an event which may be recorded. A date and time of the event may be displayed 152. A secondary image 154 may appear which may provide visual representation of the flying object. The visual representation may be still images or may be video images. The secondary image 154 may appear on a second screen or may appear as a secondary image on the first screen.

The GUI 142 may visually change the display to represent the degree of an alert. In some embodiments, the GUI 142 may use color to visually represent the degree of the alert. For example, a green border may represent no event is occurring and operation is normal. A yellow border may indicate an object is within a predetermined distance of the wind farm and/or the mitigation volume. A red border may indicate mitigation efforts are required. A flashing red border may indicate a mishap has occurred and the flying object was struck. The colors described herein are exemplary, any color scheme may be used. Additionally or alternatively, patterns may be used to display changing alerts.

Figure 10C:
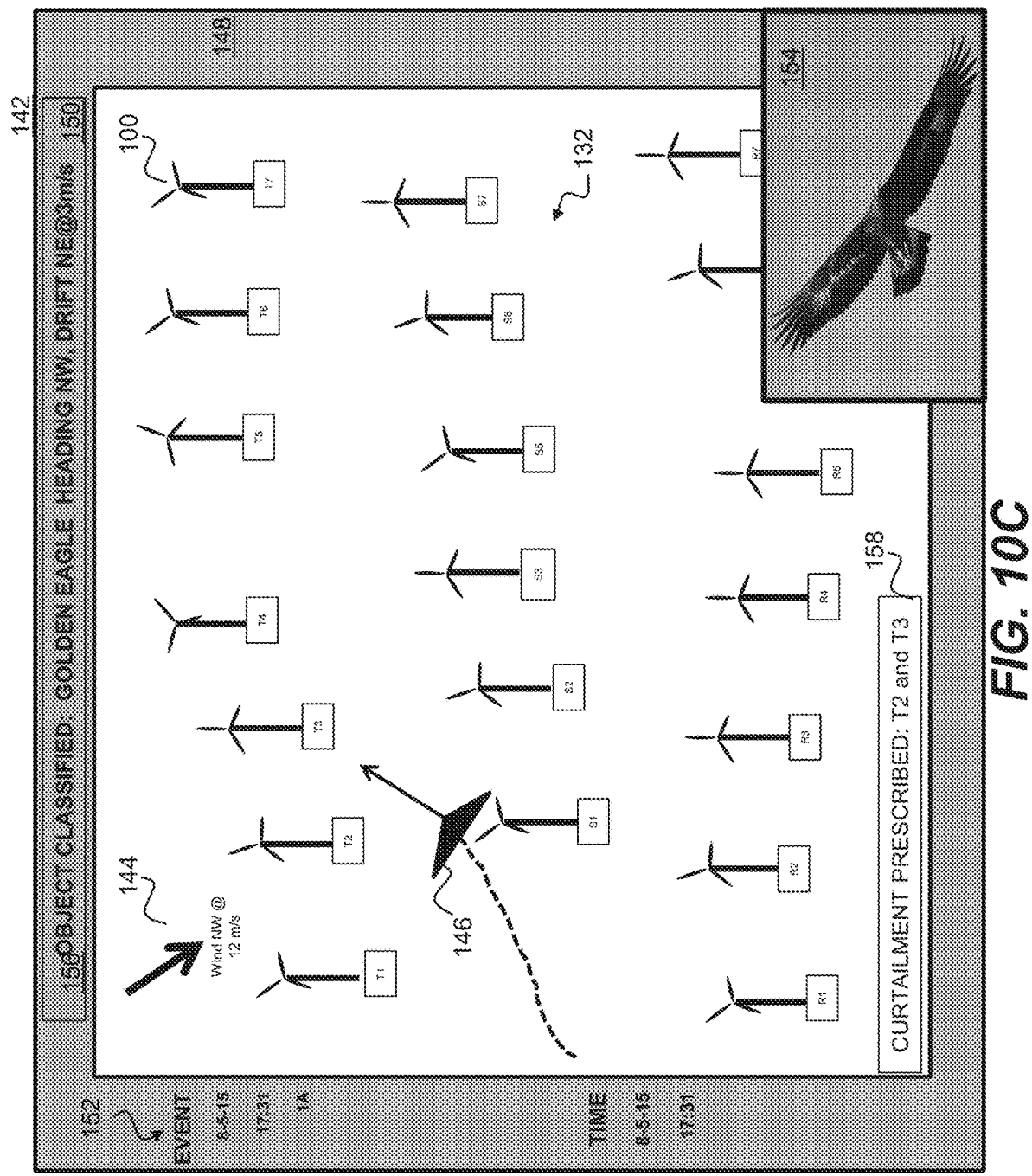

FIG. 10C depicts an exemplary representation of classification of an object 146 and mitigation activities. The classification 156 of the object 146 may be depicted on the display. The travel information 150 may also be updated as necessary. In this example, the object is classified as a golden eagle and is continuing to travel along NW, DRIFT NE @3M/S. If mitigation activities are activated, the activities 158 may additionally be displayed on the screen. In this example, the golden eagle is heading towards wind tower T2 and T3, therefore, the mitigation activities 158 displays curtailment prescribed at these towers 110.

Figure 10D:
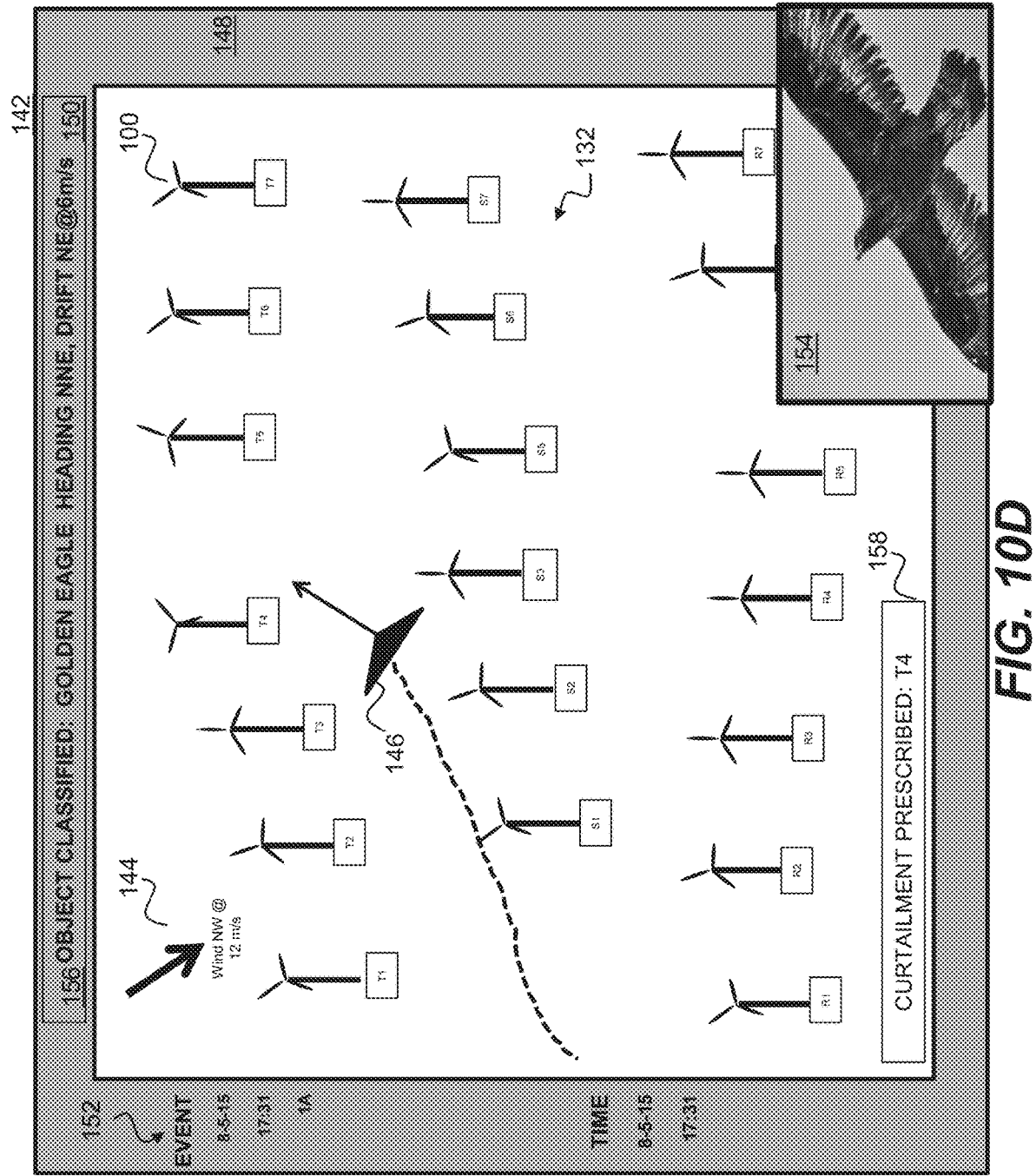

FIG. 10D depicts an exemplary representation of the GUI 142 tracking the object 146 in a real time event. In this example, the travel direction of the golden eagle has changed as depicted both visually on the screen and in writing. As the direction of the golden eagle has changed, so too has the mitigation activity warning 158. The secondary image 154 of the golden eagle may provide additional behavioral information on the bird. For example, the golden eagle may have changed its behavior from a hunting mode to an aware flight mode. This may indicate the golden eagle has become aware of the surroundings and may be exiting the wind farm.

Figure 10E:
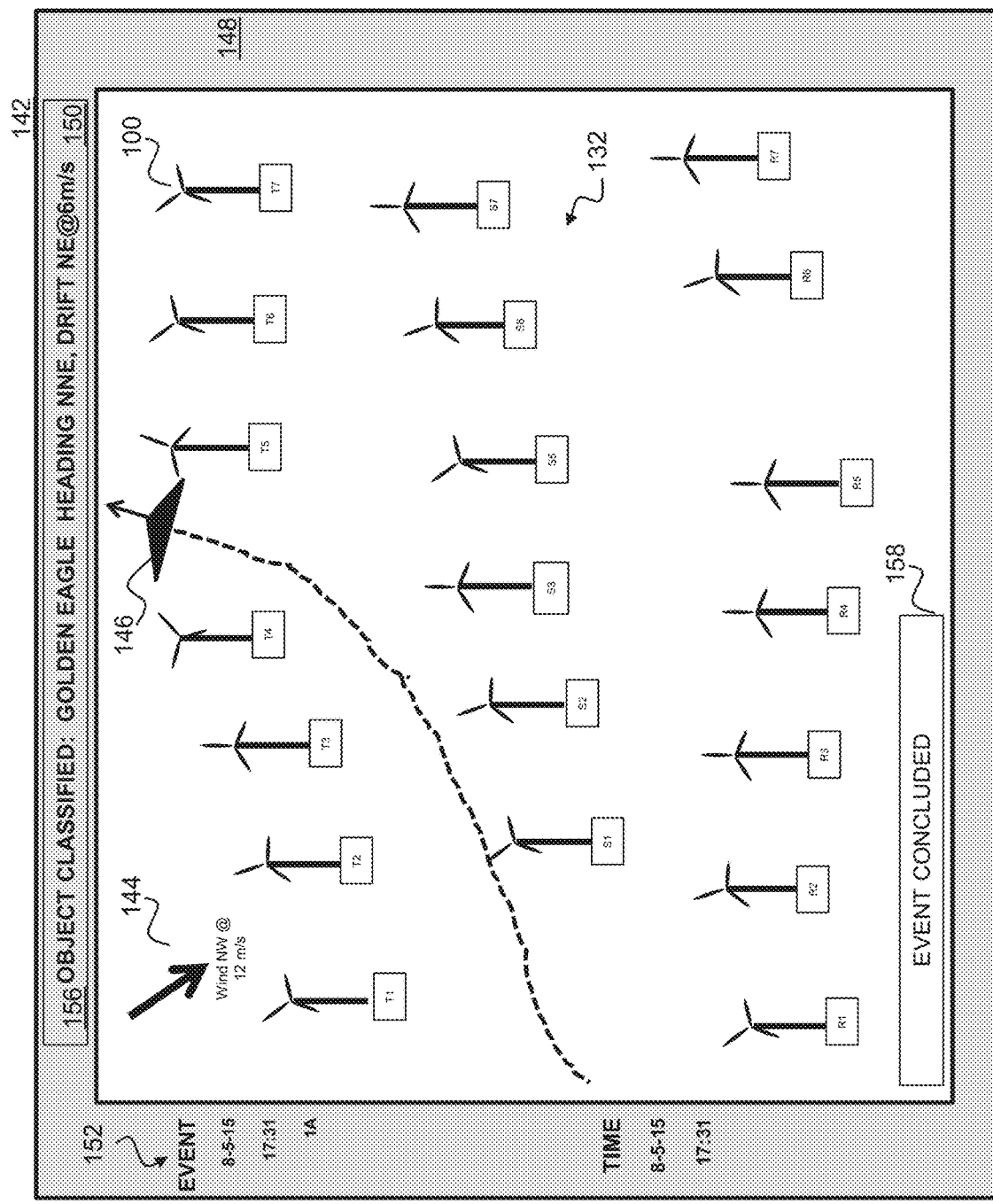

FIG. 10E depicts an exemplary representation of the GUI 142 tracking of the object 146 in a real time event. In this example, the golden eagle has exited the wind farm. The alert color of the border 148 may be downgraded from a red color to a yellow color as active monitoring is occurring. The event may still be recorded after the golden eagle has exited the wind farm and may continue to be recorded until the golden eagle is beyond a secondary safe zone. When this occurs, the event may be concluded and all information recorded. If the golden eagle returned, a new event would be created and tracked.

Figure 11:
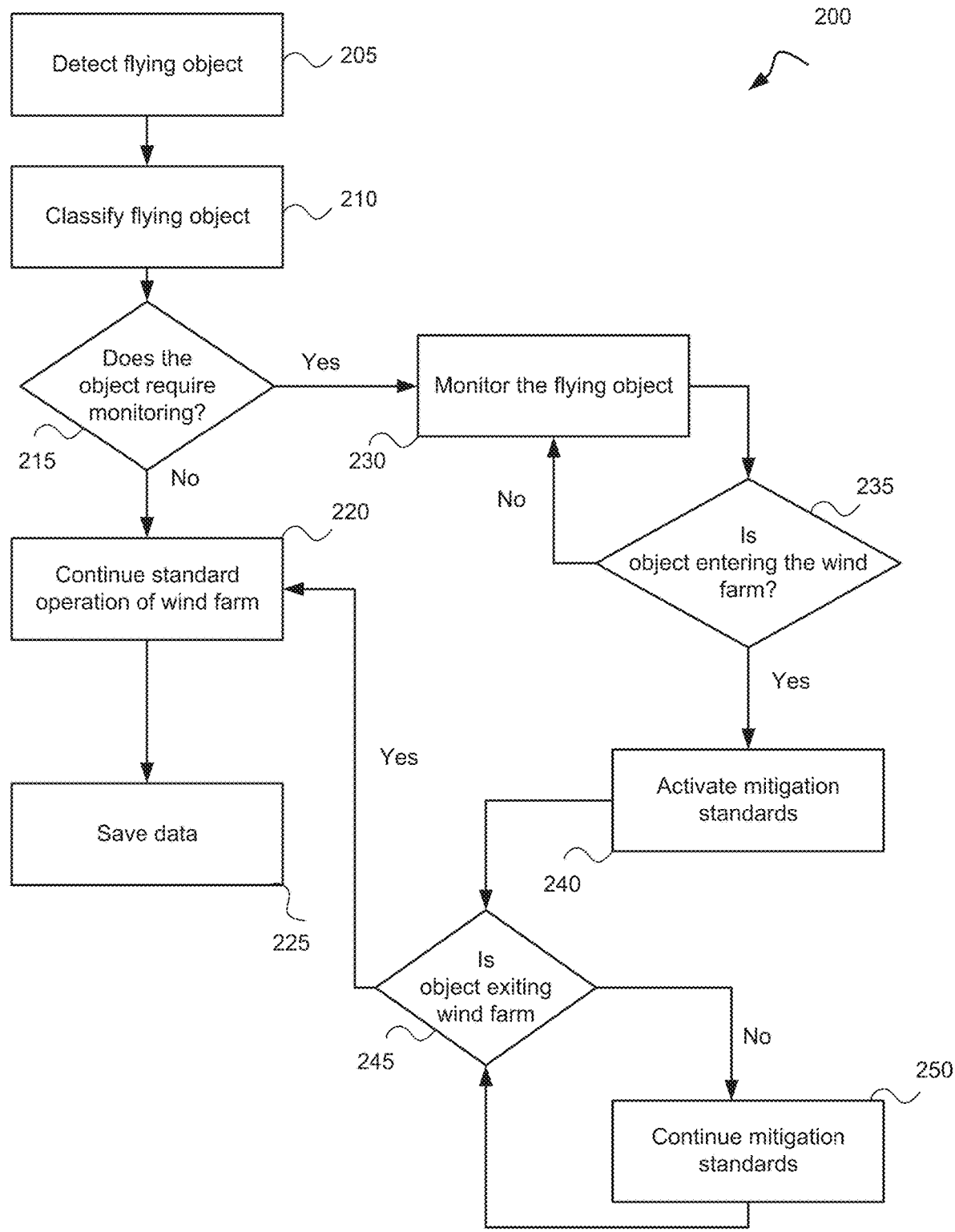
FIG. 11 is an exemplary flow diagram pertaining to detection systems as disclosed herein.

FIG. 11 is a flow diagram of a method 200 of a potential mitigation effort of a flying animal. A single detection system may perform all the steps, or, in some embodiments, an array of detection systems may perform the steps, or some combination thereof. In some instances, a central database and/or cloud computing system may perform some of the steps of the method 200. Additionally or alternatively, the method 200 may provide a user interface to interact with a person who may interface with the computing system to initiate steps.

At block 205, the method 200 may detect a flying object. The flying object may be detected by one of the low resolution camera systems. In some embodiments, multiple detection systems may detect the flying object. The detection of the object by the low resolution by activate one or more high resolution imaging systems to capture the flying object. The low resolution camera systems may be fixed systems that capture a predetermined area surrounding a detection system tower and/or wind tower. In some embodiments, the wind farm may be equipped with wide view imaging systems. The wide view imaging systems may allow fewer low resolution cameras to be used while still providing complete image data capture ability of the wind farm.

At block 210, the high resolution imaging systems may use multiple techniques to classify the object. For example, the high resolution imaging system may use single images to classify the object. The method 200 may additionally use multiple high resolution imaging systems to classify the object. The multiple imagines may be combined to form a stereoscopic image which may increase the accuracy of classifying the object and behavior. Individual high resolution imaging systems may transfer their image information to a central database such as a cloud server for identification. The method 200 may additionally transmit other information collected by the detection systems such as radar information, meteorological information, and the like. The radar information may be collected using a radar system proximate a high resolution camera. The radar may provide accurate location data regarding the flying object to ensure appropriate mitigation activities are undertaken. The meteorological information may include meteorological data points collected through one or more meteorological instruments proximate an image system. All of the information collected by the systems may be streamed to a server, such as a cloud server, as the information is gathered.

The cloud server may compile all of the information and transmit the information to a cloud server. The information may enable a cloud server to make a positive classification. In some embodiments, as discussed further below, the cloud server may use a user interface to provide the classification and detection information to a person such as a scientist for further analysis. In some instances, the person may have the ability to correct information of classification and behavior. The classification may include type of species, protected status, behavioral status, and the like. The cloud server may additionally be able to identify a travel trajectory of the flying object and a travel speed. These data points may aid in potential mitigation should the flying object approach a wind farm.

At block 215, the method 200 may determine if the object requires monitoring. A flying animal may require monitoring if the flying animal meets a threshold classification. The threshold classification may include protected and/or endangered species of animals. The monitoring may track the movements of the animal which may enable a mitigation efforts to prevent injury and/or death to the flying animal. In another instance, the object may require monitoring if the object could damage a wind turbine. For example, a large unmanned air vehicle (UAV) may have the potential to cause damage to a wind tower and may require monitoring.

If the object does not require monitoring, then at block 220 the wind farm may continue its standard operation. An object may not require monitoring if it does not meet a threshold classification, a threshold location, does not pose a threat to the windfarm, and the like. A threshold location may include a predetermined distance from the wind and/or a travel trajectory and speed. For example, the flying object may include a flying animal that was captured by the detection system but is traveling away from the wind farm or is traveling at a trajectory that will not encounter the wind farm.

At block 225, the method 200 may include saving the data relating to the detection event. The data may be saved to a local server or may be stored on a cloud server. The detection event data may provide historical information for the wind farm, may provide information if a mishap occurs, such as the death of a threshold animal, damage to the wind farm, and the like. The detection event data may additionally be used for capturing information pertaining to the wind farm and generating daily, monthly, annual reports, and the like. The reports may provide insight into the location of the wind farm. For example, if the detection system is set up as an initial matter before the installation of a wind farm, the detection event information may provide information to determine exact location of wind towers and/or if the location is suitable for a wind farm. If the detection system is set up before a wind farm, the location of wind towers may be simulated such that the server may run a simulated wind farm to determine whether the flying object may enter the proposed location of the wind farm.

If the object requires monitoring, then at block 230, the method 200 may monitor the flying object. This may include monitoring the movement of the flying object. The movements may be monitored by a single system or by a plurality of systems such as an array of detection systems. Monitoring the movement may include monitoring the trajectory and travel speed of the flying object, the location within the wind farm, and the like. The flying object may also be monitored to determine if a status of the object has changed. For example, a raptor may be hunting but may change its behavioral status to traveling upon realization of the wind turbines.

Part of monitoring the flying object may be, at block 235, determining if the object is approaching and/or entering a wind farm and/or a mitigation volume surrounding a wind turbine. If the flying object is approaching the wind farm, at block 240, the method 200 may activate mitigation standards. The mitigation standards may include terminating blade functionality of a wind tower and/or activating deterrent technology. The blade functionality may include reducing the blade speed to 0 RPM or an alternative safe spinning speed. The deterrent technology may include flashing lights and/or noises to scare the flying object away from the wind towers. A single wind tower may perform this functionality alone, or may work in conjunction with an array of detection systems and wind towers to complete the process.

During the mitigation standards, the method 200 may continue to monitor the movements of the flying object. If the flying object does not exit the wind farm, at block 250, the method 200 may continue mitigation standards and continue to monitor the flying object until the object exits the wind farm. If, at block 245, the method 200 detects the object exiting the wind farm, the method 200, at block 220, may continue standard operation of the wind farm and, at block 225, save the data from the event. Saving the information may include generating an event log of the flying objects journey through the wind farm. This may include classification of the object, initial behavior and any behavioral changes, trajectory, travel speed, quantity if there is more than one, and the like. The information may additionally include any mitigation efforts. The mitigation efforts may include detailed information of wind turbine curtailment. The curtailment may include a location of the flying object when the curtailment was initiated, the details of curtailment (curtailment to zero or to a reduced speed), resumption of operation, and the like. Mitigation efforts may additionally include any deterrent methods such as flashing lights or noises initiating to deter a flying object from entering the wind farm or approaching a wind turbine. The event information may further include a time and date of the event and if any override procedures were enacted. For example, a computer may have misclassified the object or its behavior and a person may have overridden the classification. Similarly, the computer may have either initiated or not initiated curtailment or deterrent procedures when personnel may have deemed it necessary and manually requested the mitigation procedures. All of the event information may be stored on a server. The server may be a local server, a cloud server, or some combination thereof.

Figure 12:
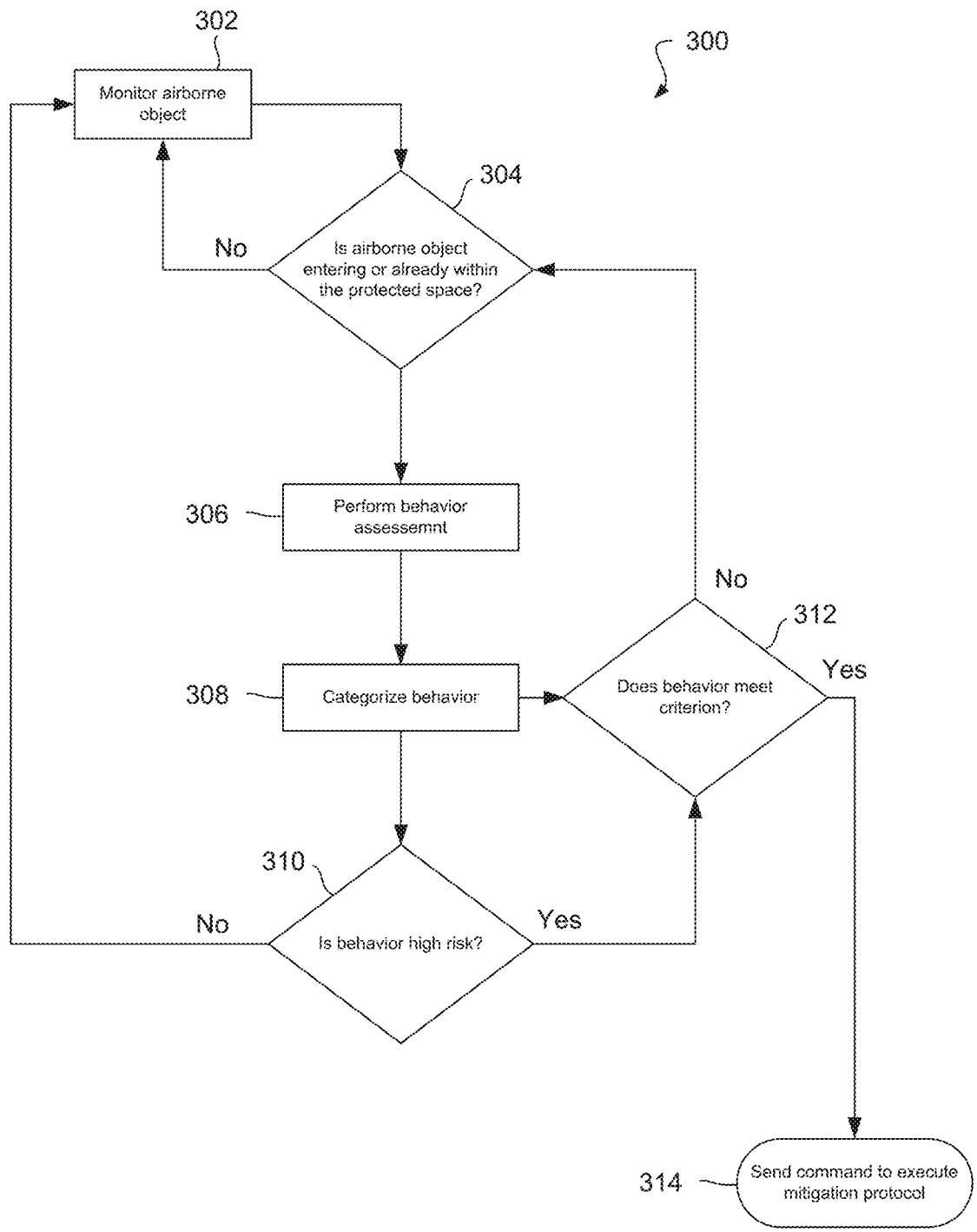
FIG. 12 is an exemplary flow diagram pertaining to detection systems as disclosed herein.

FIG. 12 depicts an example of a method 300 pertaining to a detection system. In this example, the method 300 includes monitoring 302 an airborne object, determining 304 whether the airborne object is entering or already within the protected space, performing 306 behavior assessment of the airborne object, categorizing 308 the airborne object's behavior, determining 310 whether the behavior is high risk, determining 312 whether the behavior meets a criterion, and sending 314 a command to execute a mitigation protocol.

At block 302, the airborne object is monitored. In some examples, the airborne object is spotted through a low resolution camera, a high resolution camera, a plurality of cameras, or combinations thereof. In some examples, the airborne object is monitored with other types of equipment besides just cameras. For example, the airborne object may be monitored with the use of microphones, radar systems, distance cameras, thermal sensors, other types of equipment, or combinations thereof.

At block 304, the system determines whether the airborne object is entering the protected space or is already in the protected space. If the airborne object is not in the protected space, the system continues to monitor the airborne object. On the other hand, if the airborne object is either entering the protected space or is already in the protected space, the airborne object's behavior is analyzed.

At block 306, the airborne object's behavior is analyzed. In examples where the airborne object is a bird, the system may take note about the bird's flying characteristics, such as whether the bird is soaring, gliding, flapping, and so forth. Also, the system may take notice of whether the bird's head is up or down. Further, the system may take note of any behavior that may indicate whether the bird is hunting, migrating, performing another type of activity, or combinations thereof.

At block 308, the behavior of the airborne object is categorized. Continuing with examples of the airborne object being a bird, the categories may include details that help the system determine whether the bird vulnerable to be injured or killed by the wind farm. Such categories may include a hunting category, a migrating category, another type of category, or combinations thereof. Such categories may include subcategories that give more detail that describes the bird's behavior.

At block 310, the system determines whether the airborne object's behavior is a high risk. The system may make this determination based on historical trends attributed to the assigned category described above. Further, more than just the airborne object's behavior may be analyzed. For example, the weather conditions, operational status of the wind farm, environmental conditions, the airborne objects direction of travel, and other types of factors may be analyzed to determine whether there is a high risk that the airborne object will be injured, killed, damaged, destroyed, or combinations thereof. If the risk is low, then the system may continue to monitor the airborne object. On the other hand, if the risk is high, the system determines whether the airborne object's behavior meets a criterion associated with activating the mitigation system.

At block 312, the system determines whether the airborne object's behavior meets the criterion. In this case, if the airborne object's behavior does not meet the criterion, the system will repeat portions of the method beginning at determining again whether the airborne object is still in the protected area. On the other hand, if the airborne object's behavior does meet the criterion, a command may be sent to at least one of the windmill towers to initiate a mitigation procedure.

At block 314, a command is sent to at least one of the windmill towers to initiate a mitigation procedure/curtailment procedure. In some examples, a signal may be sent to an operator whether the operator decides whether to initiate a curtailment procedure, a determent procedure, or another type of mitigation procedure. In other examples, a command signal is sent directly to at least one windmill tower to initiate the selected procedure without human involvement.

While the examples above have been described with specific wind farms, any appropriate wind farm may be used in accordance with the principles described herein. For example, just some of the towers in the wind farm may include turbine blades. The other towers in the wind farm may be dedicated to other purposes. For example, at least one tower may be included in the wind farm that is dedicated to just airborne object detection. This type of tower may include a high resolution camera, a low resolution camera, another type of camera, or combinations thereof. In other examples, each of the towers in the wind farm are equipped with wind turbines. Further, in some examples, each of the wind towers are equipped with camera, but in other examples a subset of the wind towers include cameras.

A server may be incorporated in any appropriate tower, such as a dedicated airborne object detection tower, a wind tower, or other type of tower. In some cases, the server is not located in the wind farm, but is in wireless communication with the towers in the wind farm.

While the examples above have been described with reference to specific examples of risk mitigation, any appropriate type of risk mitigation may be employed in accordance to the principles described herein. For examples, the risk mitigation may involve determent systems such as employing lights and sounds to cause airborne animals to leave the wind farm. In other examples, the mitigation system may include curtailment procedures where the turbine speed is reduced and/or stopped. In yet other examples where the airborne object is a drone or another type of inanimate object, the airborne object may be disabled through electromagnetic mechanisms, lasers, jamming signals, guns, projectiles, other types of mechanisms, or combinations thereof.

While the protected areas have been described as wind farms, any appropriate type of wind farm may be used in accordance with the principles described in the present disclosure. For example, the protected area may include an airport, a prison, a stadium, a research facility, a building, a solar farm, a developmental area, an area of interest, a construction site, a national monument, a national park, another type of protected area, any designated area, or combinations thereof.

This disclosure is illustrative and not limiting. Further modifications will be apparent to one skilled in the art in light of this disclosure and are intended to fall within the scope of the appended claims.

What is claimed is:

1. A method of analyzing an airborne object movement in a designated area, the method comprising the steps of:
    monitoring airspace in all approachable directions around the designated area with a plurality of wide field of view cameras connected to a detection tower and configured to provide a substantially hemispherical mitigation volume surrounding and extending above the detection tower;
    detecting the airborne object through a wide field of view camera;
    activating a tracking camera connected to the detection tower to track the airborne object;
    obtaining a high resolution image of the airborne object with the tracking camera;

transmitting, automatically through a computing device, the high resolution image to a server;

classifying, through the server, the airborne object based at least in part on the high resolution image; and monitoring the airborne object with the tracking camera as the airborne object enters the designated area when the airborne object satisfies a set of characteristics derived during the classifying step.

2. The method of claim 1, further comprising the step of classifying the airborne object as at least one of a predetermined living species or an inanimate object.

3. The method of claim 2, further comprising the step of activating mitigation efforts within the designated area when the airborne object meets a threshold classification and a threshold location.

4. The method of claim 3, wherein the mitigation efforts uses a mitigation system to disable an inanimate object, the mitigation system comprising: an electromagnetic transmitter, a laser, a jamming signal transmitter, a gun, a projectile, or a combination thereof.

5. The method of claim 3, wherein the airborne object is an airborne animal, the designated area corresponds to a windfarm, and the mitigation efforts comprises curtailing one or more wind turbines.

6. The method of claim 1, wherein the airborne object is a drone or aircraft.

7. The method of claim 6, wherein the designated area is an airport, a prison, a stadium, a research facility, a wind farm, a solar farm, a developmental area, a construction site, a national monument, a national park, or combinations thereof.

8. The method of claim 1, wherein the step of activating the tracking camera to track the airborne object occurs for the airborne object that is at a distance of 600 m or greater from the detection tower.

9. The method of claim 1, wherein each wide field of view camera has a field of view that partially overlaps with another wide field of view camera.

10. The method of claims 1, wherein the activating the tracking camera step comprises controlling a positioner to rotate and tilt the tracking camera to continuously track a moving airborne object.

11. The method of claim 10, wherein the positioner is a pan and tilt system.

12. The method of claim 1, further comprising the step of measuring a distance to the airborne object by using a second tracking camera to form a stereoscopic image with an image from the tracking camera.

13. The method of claim 1, further comprising the step of measuring a distance to the airborne object by using one or more of: a range finder; a radar; or a second camera.

14. The method of claim 1, further comprising the step of tracking the airborne object with a radar system to improve location determination of the airborne object.

15. The method of claim 1, wherein the wide field of view cameras are in a fixed position.

16. The method of claim 1, wherein the wide field of view cameras generate images from visible light or from infrared light.

17. The method of claim 1, further comprising the step of deploying a deterrent measure to deter a living moving object from approaching a wind turbine positioned in the designated area.

18. The method of claim 1, wherein the detection tower is a wind turbine tower.

19. The method of claim 1, wherein the detection tower is a stand-alone tower.

\* \* \* \* \*